(12) United States Patent
Roberts et al.

(10) Patent No.: US 9,987,569 B2
(45) Date of Patent: Jun. 5, 2018

(54) UNDERDRAIN FOR A FILTER SYSTEM FOR FILTERING WATER OR WASTEWATER AND A METHOD OF WASHING A FILTER SYSTEM

(71) Applicant: ROBERTS MARKETING DE, INC., Wilmington, DE (US)

(72) Inventors: R. Lee Roberts, Rose Valley, PA (US); Roderick Ross Mellott, Mountville, PA (US)

(73) Assignee: Roberts Marketing DE, Inc., Wilmington, DE (US)

(*) Notice: Subject to any disclaimer, the term of this patent is extended or adjusted under 35 U.S.C. 154(b) by 215 days.

(21) Appl. No.: 14/740,224

(22) Filed: Jun. 15, 2015

(65) Prior Publication Data

US 2015/0273364 A1    Oct. 1, 2015

Related U.S. Application Data

(63) Continuation-in-part of application No. 13/506,852, filed on May 21, 2012, now Pat. No. 9,072,989.

(51) Int. Cl.
 *B01D 24/24* (2006.01)
 *B01D 24/46* (2006.01)

(52) U.S. Cl.
 CPC ......... *B01D 24/24* (2013.01); *B01D 24/4631* (2013.01)

(58) Field of Classification Search
 CPC ...... B01D 24/22; B01D 24/24; B01D 24/266; B01D 24/4631; B01D 24/4636
 See application file for complete search history.

(56) References Cited

U.S. PATENT DOCUMENTS

| | | | | |
|---|---|---|---|---|
| 5,019,259 A | * | 5/1991 | Hambley | B01D 24/24 210/274 |
| 5,269,920 A | * | 12/1993 | Brown | B01D 24/24 210/274 |
| 9,072,989 B2 | | 7/2015 | Roberts et al. | |
| 2013/0306542 A1 | | 11/2013 | Roberts et al. | |
| 2014/0360591 A1 | | 12/2014 | Roberts | |

* cited by examiner

*Primary Examiner* — Matthew O Savage
(74) *Attorney, Agent, or Firm* — Merek, Blackmon & Voorhees, LLC

(57) ABSTRACT

An apparatus for use in a filter system for filtering water or wastewater. The apparatus preferably includes at least one underdrain lateral having at least an inner chamber, a first outer chamber and a second outer chamber. The first outer chamber and the second outer chamber are preferably in fluid communication with the inner chamber. The inner chamber, the first outer chamber and the second outer chamber are preferably formed by an inner liner and an outer liner. The outer liner is a separate piece from the inner liner and surrounds the inner liner. The inner chamber is preferably configured to simultaneously receive a liquid and a gas during a washing procedure including simultaneous use of a liquid and gas to clean a filter bed to create a liquid and gas interface in the inner chamber.

20 Claims, 23 Drawing Sheets

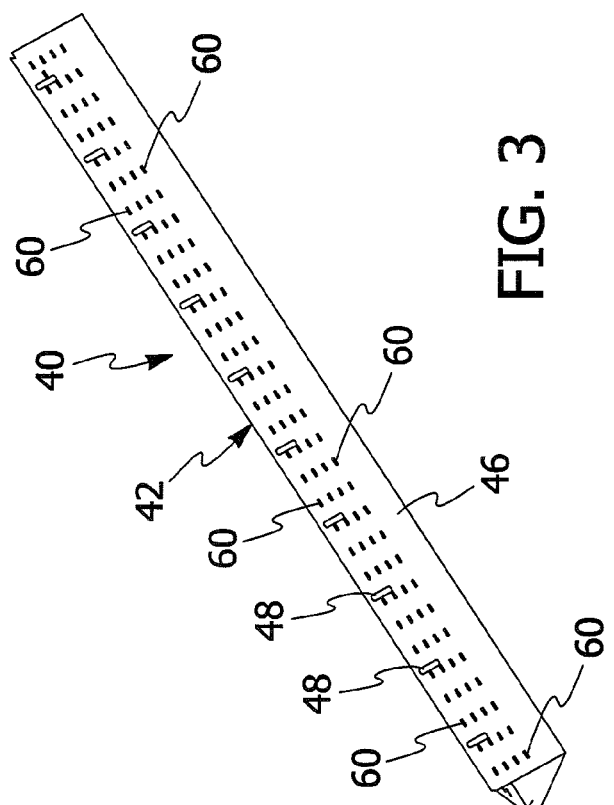
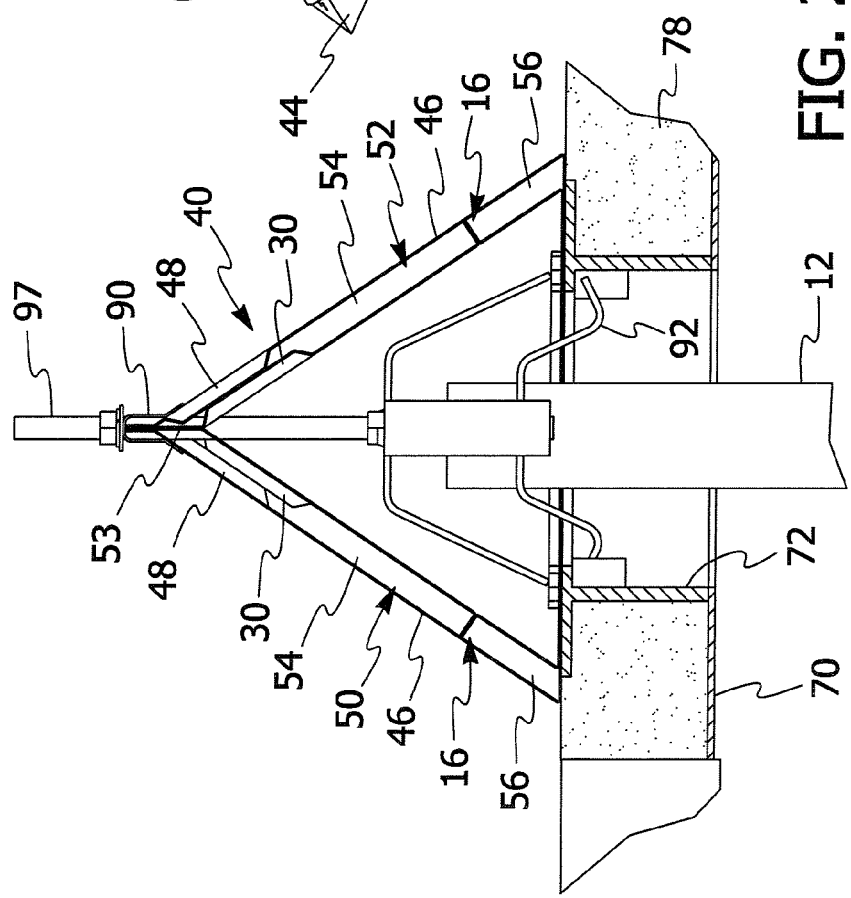

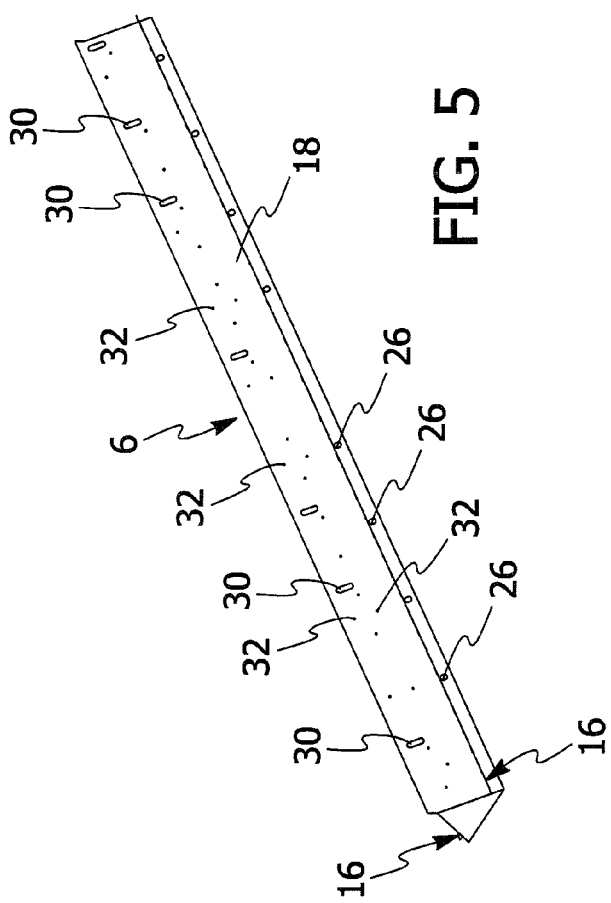
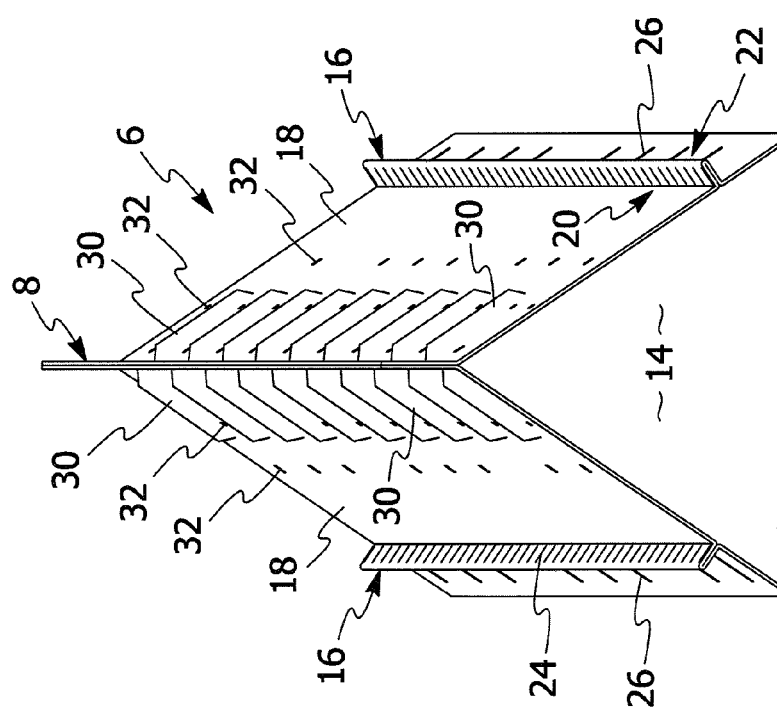

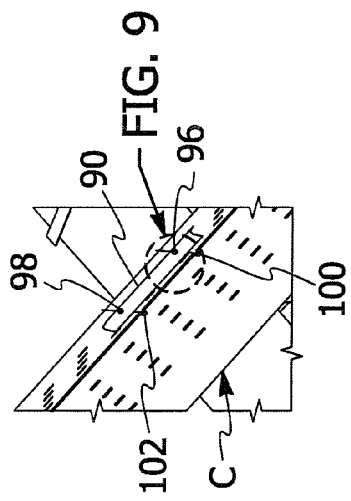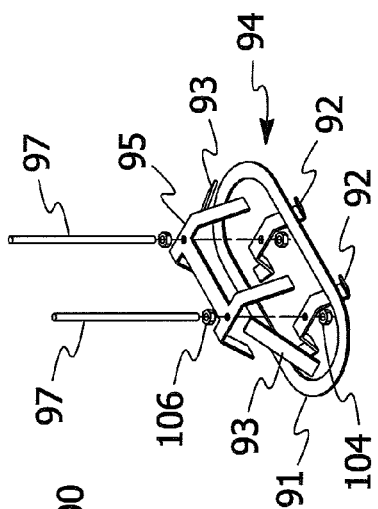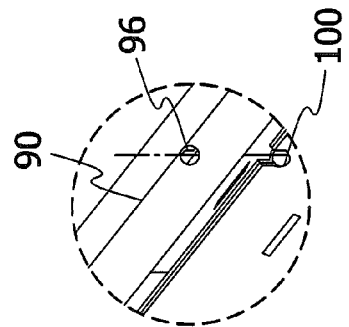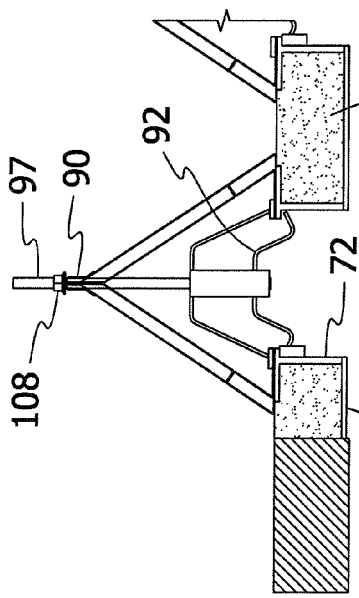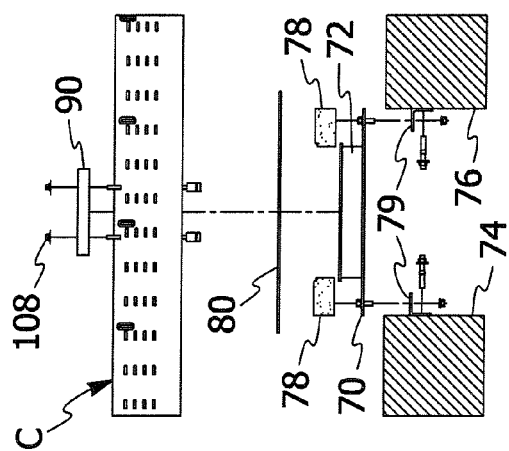

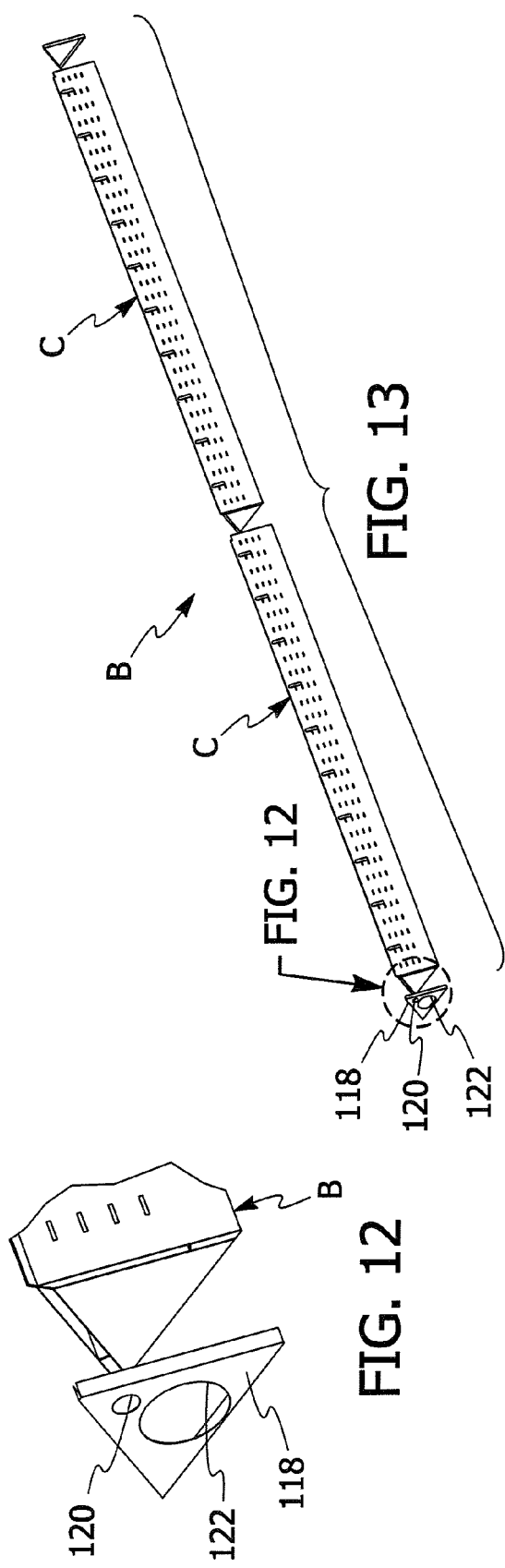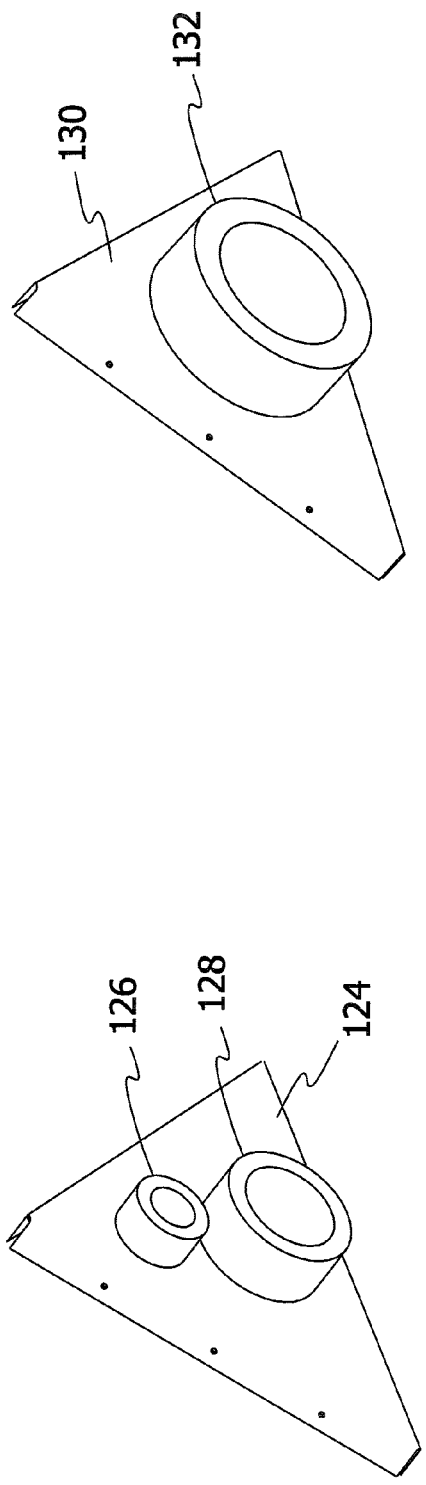

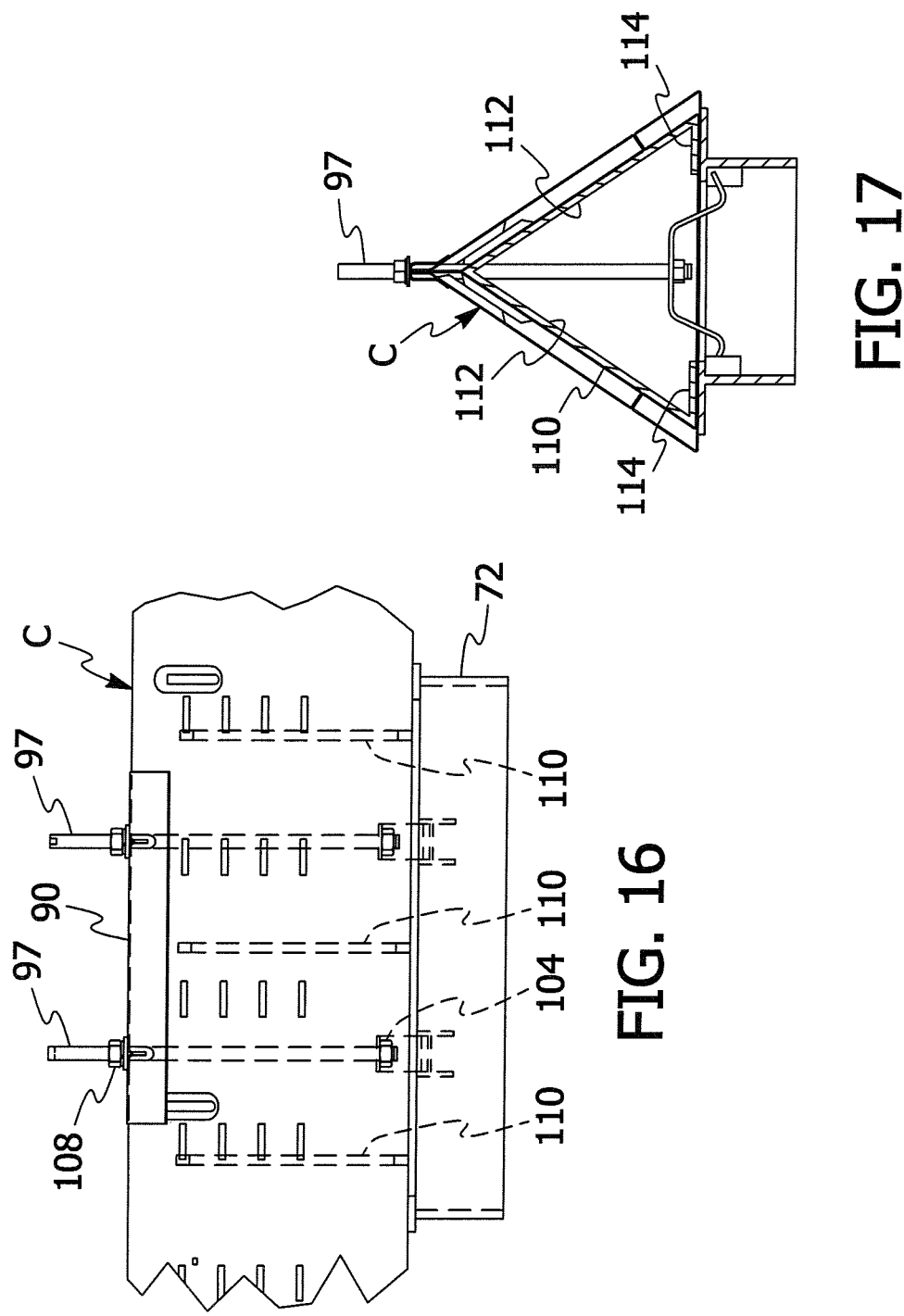

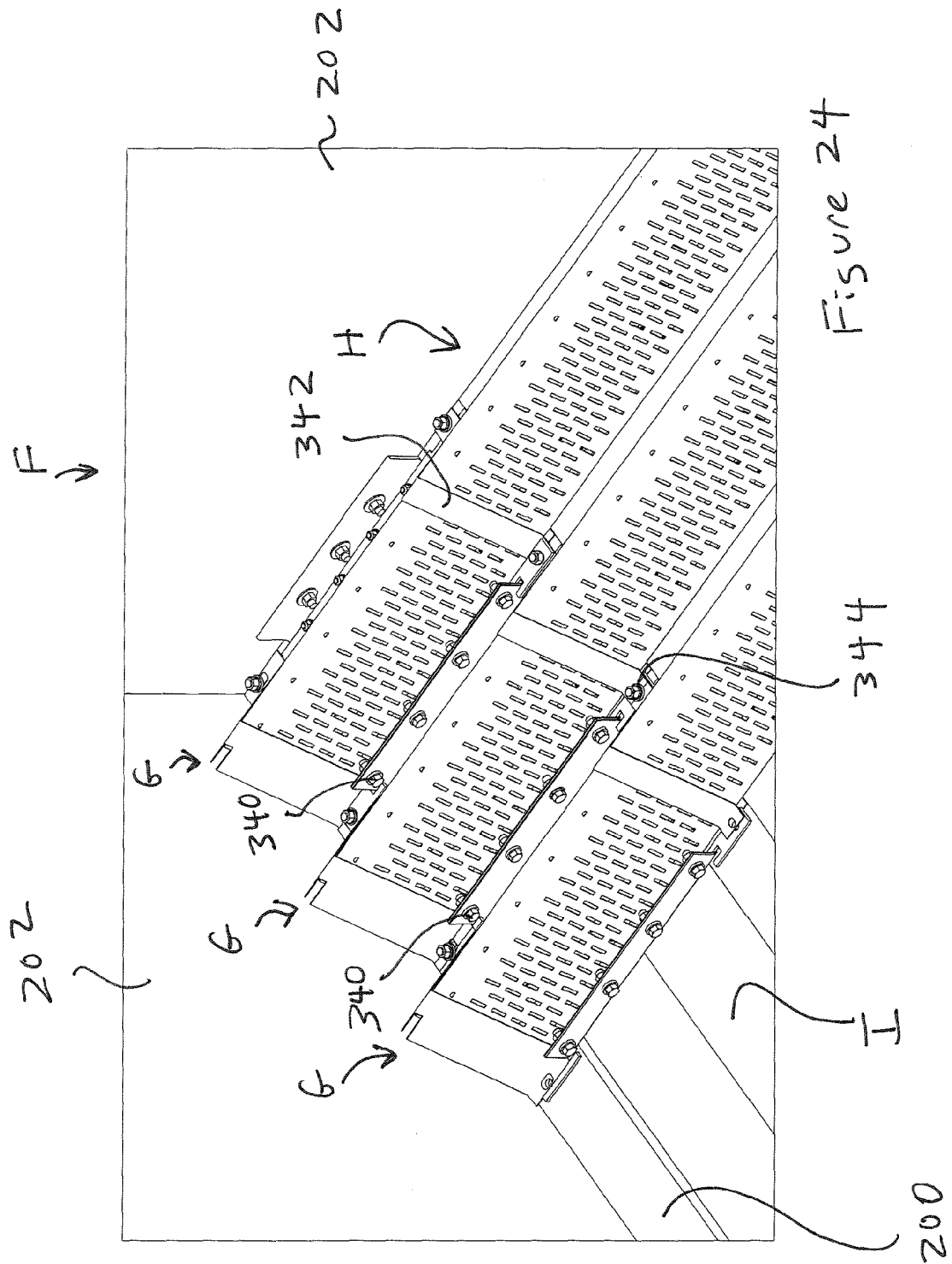

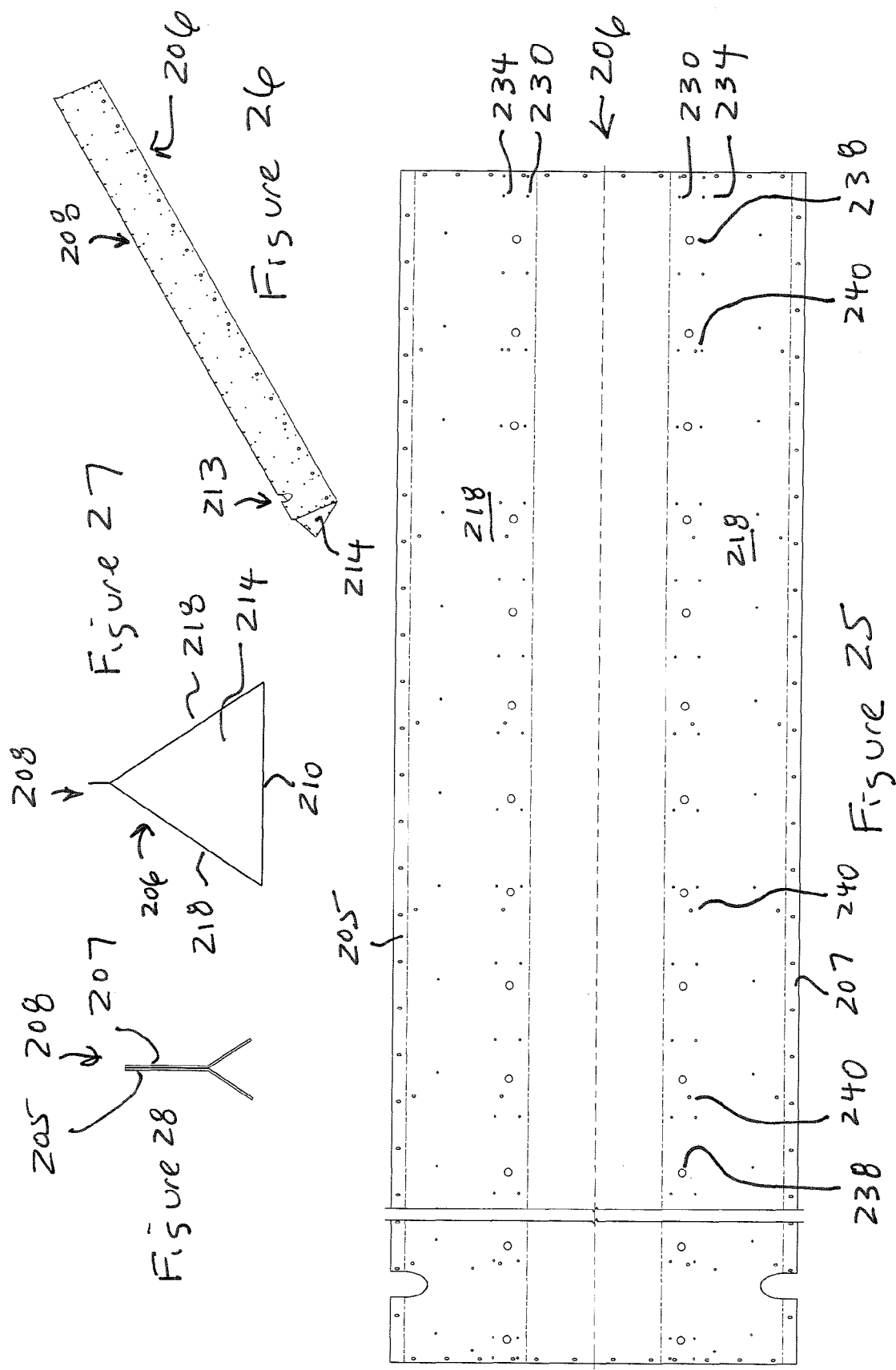

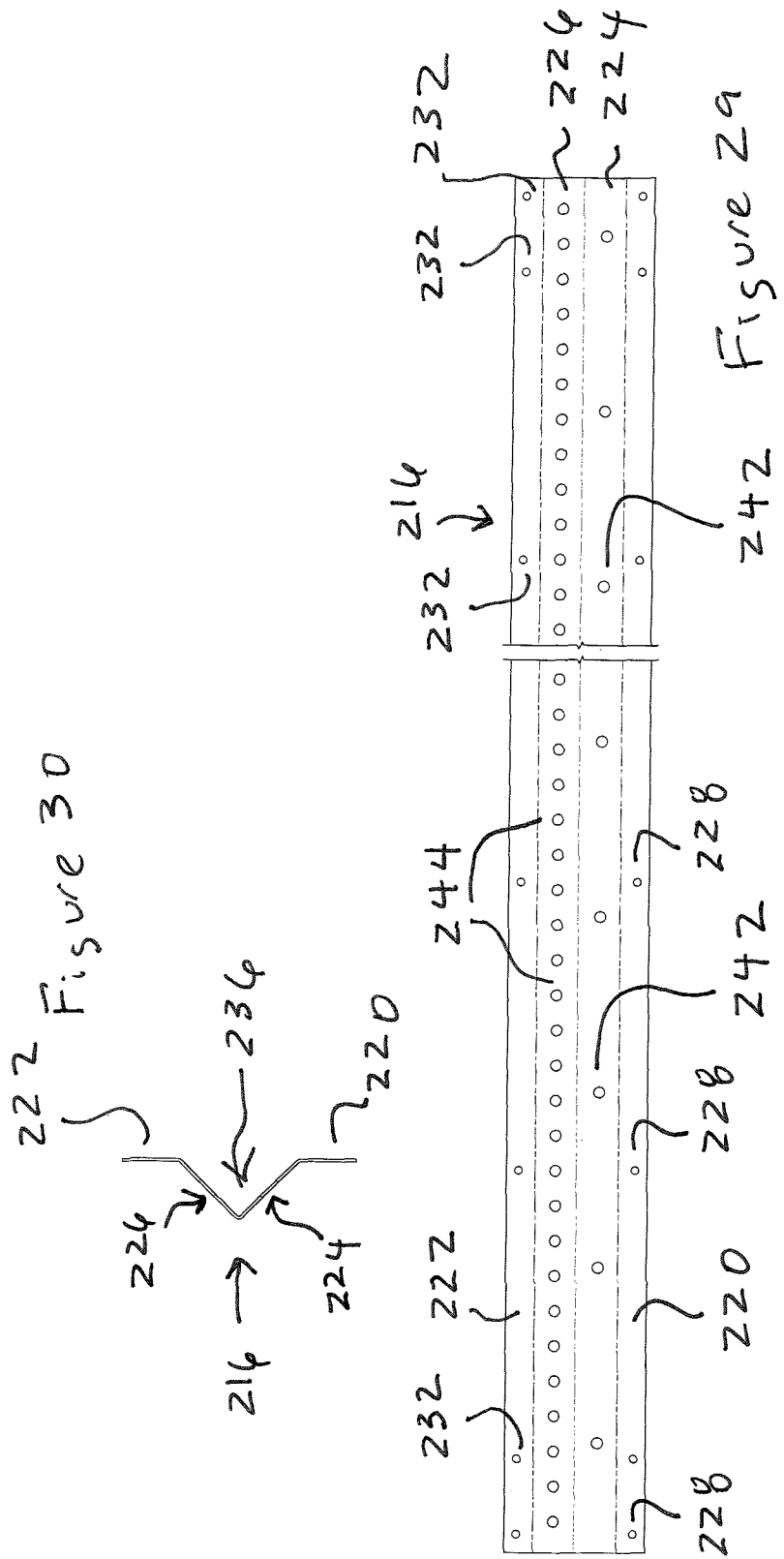

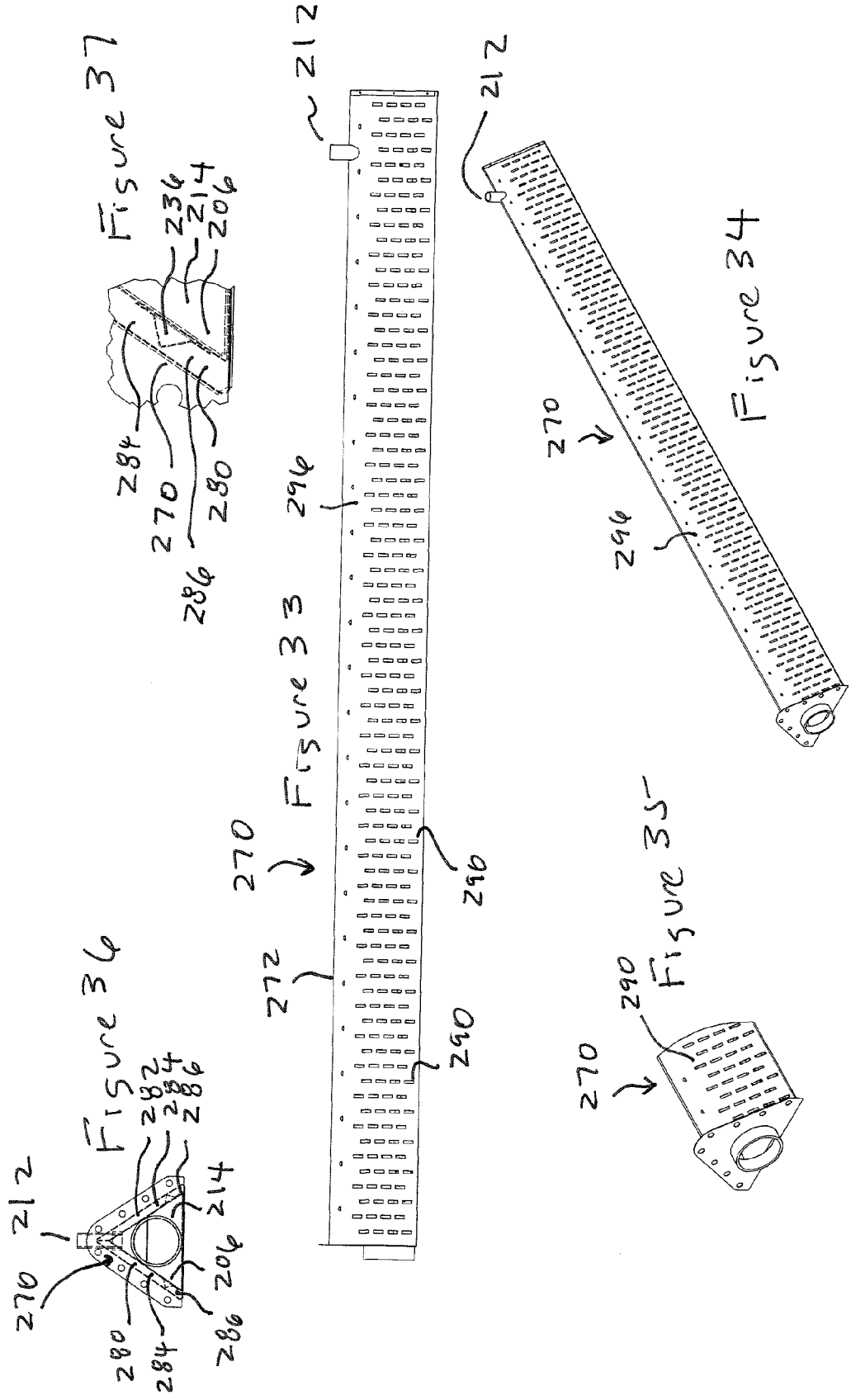

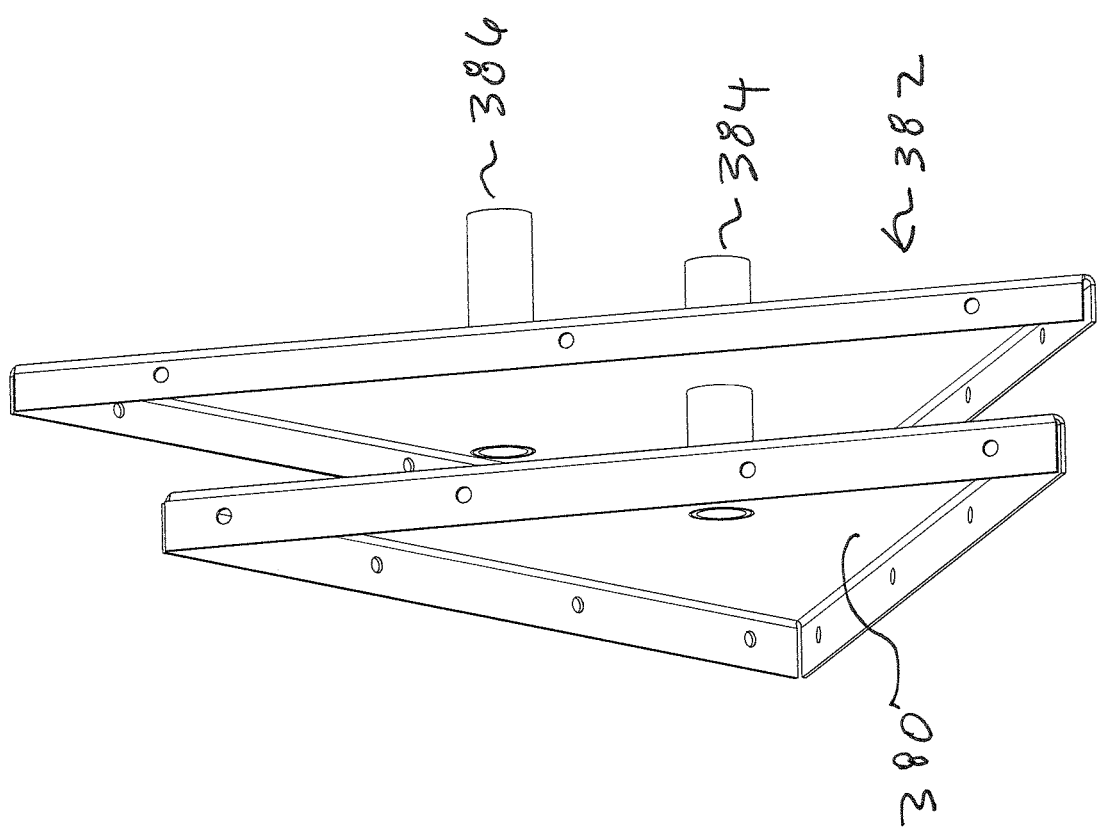

UNDERDRAIN FOR A FILTER SYSTEM FOR FILTERING WATER OR WASTEWATER AND A METHOD OF WASHING A FILTER SYSTEM

RELATED APPLICATIONS

The subject patent application is a continuation-in-part of U.S. patent application Ser. No. 13/506,852 filed on May 21, 2012. The entire content of U.S. patent application Ser. No. 13/506,852 is incorporated herein by reference.

FIELD OF THE INVENTION

The present invention is directed to water and/or wastewater filter systems for filtering impurities from a liquid. More particularly, the present invention is directed to an underdrain for a filter system and a method of washing a filter system using the underdrain.

BACKGROUND OF THE INVENTION

Various filter systems have been developed to filter water and wastewater. Typical filter systems include but are not limited to upflow filters, upflow clarifiers, a downflow downflow clarifiers, bi-flow filters as well as various combinations of the aforementioned filter systems. The terms upflow filter and upflow clarifier refer to filter systems in which influent to be filtered is directed in an upward path to remove impurities. Conversely, the terms downflow filter and downflow clarifier refer to filter systems in which the influent is directed in a downward path to remove impurities. Bi-flow filters refer to filter systems in which the influent is directed in both a downward path and an upward path to remove impurities. The upflow fitters/clarifiers, downflow filters/clarifiers and bi-flow filters include one or more filter beds formed from one or more layers of filter media. The filter media may be supported by one or more layers of gavel. Alternatively, the one or more gravel layers may be replaced with a porous plate or other direct retention systems.

In a combined system, for example, an upflow fitter/clarifier followed by a downflow filter, the influent is initially directed upwardly through the upflow filter/clarifier to remove a predetermined percentage of the impurities in the influent and then directed downwardly through the downflow filter to remove the remaining impurities to within an acceptable limit. Where the filter system includes multiple downflow filters connected in series, the influent is directed downwardly through each of the downflow filters one after the other to remove impurities within an acceptable limit.

Regardless of the type of granular bed filter system and/or the type of the liquid to be filtered, it is common for the filter system to include an underdrain. The underdrain directs and receives fluids during operation of various cycles of the filter system including the filtration cycle (also referred to as a service run) and a washing cycle. The washing cycle may be performed by directing the washing fluid in a path opposite to the path of influent during the filtration cycle or the washing cycle may be performed by directing the washing fluid in the same path as the path of the influent during the filtration cycle. The washing fluids may include influent, pre-filtered water, air or other suitable gas. A key function of the underdrain is to evenly distribute the washing fluid through the filter bed during the washing cycle so that at least a significant amount of the impurities trapped in the filter can be removed. In the event that the underdrain does not evenly distribute the washing fluid through the filter bed, the filter bed will likely not be properly cleaned. At a minimum, this will cause much shorter filtration cycles and more washing cycles. This is undesirable, as the filter system typically cannot operate in the filtration cycle during a washing cycle.

There are many different types of underdrain systems currently marketed for use in water filtration. Some underdrains are used for water only backwash and some are capable of introducing air only, water only, or simultaneous liquid and air.

A common type of underdrain is the "lateral" style. This type of underdrain is typically made of injection molded or extruded plastic or extruded clay. The underdrain blocks are arranged in rows termed "laterals". The laterals are typically spaced on approximately 12 inch centers leaving an approximately 1 inch space between the laterals. There are two common types of combined air/water lateral type underdrains. One type is configured to introduce air and water into a center compartment that directs the air and water through separate internal orifices into two adjacent, outer compartments. The air and water escape only from the two adjacent, outer compartments into the filter bed from combined air/water orifices in the two adjacent, outer compartments. The two adjacent, outer compartments form in essence dual internal laterals that extend generally the length of the single lateral. This type of system is subject to mal-distribution of one or more of the washing fluids. Specifically, the washing fluid can exit the outer compartments in an uneven manner along the length of the underdrain lateral leading to partial cleaning of the filter media. Underdrain laterals are subject to uplift forces that tend to separate the underdrain laterals from the filter floor. A common source of this uplift force is due to the upward flow of water and/or air pushing against the filter floor with a force equal and opposite to the resistance of the flow across the underdrain lateral. Should the underdrain laterals become sufficiently separated from the filter floor, the filter will become inoperable. All of the media must be removed and the underdrain repaired or completely removed. This is obviously extremely undesirable. Therefore, one aspect of a preferred embodiment of the present invention is to provide a cost effective manner of anchoring the underdrain laterals to the filter floor.

OBJECTS AND SUMMARY OF THE INVENTION

An object of the present invention is to provide a novel and unobvious underdrain and a method of washing a filter system using the novel and unobvious underdrain.

Another object of a preferred embodiment of the present invention is to provide a lateral type underdrain that ensures uniform distribution of washing liquid.

A further object of a preferred embodiment of the present invention is to provide an underdrain lateral that ensures uniform distribution of a washing gas.

Yet another object of a preferred embodiment of the present invention is to provide fluid pressure tap member that can be readily connected to a portion of the underdrain lateral to monitor fluid pressure of washing fluid to ascertain if the washing fluid is being uniformly distributed by the underdrain lateral.

Still another object of a preferred embodiment of the present invention is to provide a support assembly that prevents relative movement between an inner liner and an outer liner of an underdrain lateral.

Yet still another object of a preferred embodiment of the present invention is to provide a mal-distribution member for an underdrain lateral that forms at least a portion of a fluid receiving sub-chamber.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for use in a filter system for filtering water or wastewater. The apparatus includes at least one underdrain lateral block having a first outer sidewall, a second outer sidewall and at least one inner wall forming at least an inner chamber, a first outer chamber and a second outer chamber. The first outer chamber and the second outer chamber are in fluid communication with the inner chamber. A first mal-distribution member is disposed in the first outer chamber for preventing mal-distribution of a washing fluid. A second mal-distribution member is disposed in the second outer chamber for preventing mal-distribution of a washing fluid. The first outer chamber and the second outer chamber each have a first space for receiving a washing fluid. The first outer sidewall has at least one opening adjacent the first space of the first outer chamber through which a washing liquid in the first space of the first outer chamber can exit the at least one underdrain lateral through the first outer sidewall. The second outer sidewall has at least one opening adjacent the first space of the second outer chamber through which a washing fluid in the first space of the second outer chamber can exit the at least one underdrain lateral through the second outer sidewall. The first space of the first outer chamber is disposed above or below the first mal-distribution member and the first space of the second outer chamber is disposed above or below the second mal-distribution member.

Another preferred embodiment of the present invention is directed to an apparatus for use in a filter system for filtering water or wastewater. The apparatus includes an underdrain lateral block having a first outer sidewall, a second outer sidewall and at least one inner wall forming at least one primary chamber, at least one tower secondary chamber, at least one intermediate secondary chamber and at least one upper secondary chamber. The intermediate secondary chamber is disposed between the at least one tower secondary chamber and the at least one upper secondary chamber. The primary chamber is in fluid communication with the at least one intermediate secondary chamber. The at least one intermediate secondary chamber is in fluid communication with the at least one lower secondary chamber and the at least one upper secondary chamber such that the at least one intermediate secondary chamber directs a washing fluid to the at least one lower secondary chamber and the at least one upper secondary chamber wherein the primary chamber receives a washing fluid prior to the at least one lower secondary chamber, the at least one intermediate secondary chamber and the at least one upper secondary chamber.

A further preferred embodiment of the present invention is directed to an apparatus for use in a filter system for filtering water or wastewater. The apparatus includes at least one underdrain lateral block having an inner liner and an outer liner firming an inner chamber, a first outer chamber and a second outer chamber. The first outer chamber and the second outer chamber are in fluid communication with the inner chamber. The outer liner surrounds at least a portion of the inner liner. A support assembly is provided for preventing relative movement between the inner liner and the outer liner when a washing fluid is directed through the at least one underdrain block. The support assembly includes a first member engaging a portion of the inner liner and a second member engaging a portion of the outer liner.

Still a further preferred embodiment of the present is directed to an apparatus for use in a filter system for filtering water or wastewater. The apparatus includes at least one underdrain lateral having at least one outer wall and at least one inner wall forming at least a first chamber and a second chamber. The first chamber is in fluid communication with the second chamber. The underdrain lateral further includes a sub-chamber for receiving and directing a washing fluid. The sub-chamber is formed in the first chamber. A first mal-distribution member is disposed in the first chamber for preventing mal-distribution of a washing fluid. The first mal-distribution member and at least a portion of the at least one inner wall form at least a portion of the sub-chamber wherein the mal-distribution member is a separate piece from the at least one inner wall.

Still another preferred embodiment of the present invention is directed to an apparatus fir use in a filter system for filtering water or wastewater. The apparatus includes at least one at least one underdrain lateral having at least one outer wall and at least one inner wall forming at least a primary chamber and a secondary chamber. The primary chamber is in fluid communication with the secondary chamber such that the primary chamber directs a washing fluid during a washing cycle into the secondary chamber. The apparatus further includes a fluid pressure tap member connected to the at least one underdrain lateral such that the fluid pressure tap member is operably associated with a fluid discharge opening formed in the at least one underdrain lateral. The fluid pressure tap member includes a tap configured so that at least one component of a pressure monitor can be connected to the tap so that pressure of a fluid passing through the fluid discharge opening can be monitored.

BRIEF DESCRIPTION OF THE DRAWINGS

FIG. 2 is a cross-sectional view of an underdrain lateral formed in accordance with the preferred embodiment illustrated in FIG. 1.

FIG. 3 is a perspective view of an outer liner of the preferred underdrain lateral illustrated in FIG. 1.

FIG. 4 is a perspective view of an inner liner of the preferred underdrain lateral illustrated in FIG. 1.

FIG. 5 is another perspective view of an inner liner of the preferred underdrain lateral illustrated FIG. 1.

FIG. 7 through 11 are views of various aspects of the preferred anchor assembly.

FIGS. 12 and 13 illustrate an alternative means to supply a washing fluid to the preferred underdrain laterals.

FIG. 14 is another alternative end cap for the preferred underdrain laterals.

FIG. 15 is a further alternative end cap for the preferred underdrain laterals.

FIG. 16 is an elevation view of an alternative form of anchor assembly.

FIG. 17 is a cross-sectional view of a preferred underdrain lateral with the alternative form of anchor assembly illustrated in FIG. 16.

FIG. 24 is an enlarged view of FIG. 23 showing in greater detail the support assembly illustrated in FIG. 20.

FIG. 25 is a plan view of the inner liner in blank form (i.e., prior to bending) of the underdrain lateral block illustrated in FIG. 20.

FIG. 26 is a perspective view of the inner liner of the underdrain lateral block illustrated in FIG. 20.

FIG. 27 is a cross-sectional view of the inner liner of the underdrain lateral block illustrated in FIG. 20.

FIG. 28 is a cross-sectional view of the upper portion of the inner liner of the underdrain lateral block illustrated in FIG. 20.

FIG. 29 is a plan view of the mal-distribution member in blank form (i.e., prior to bending) of the underdrain lateral block illustrated in FIG. 20.

FIG. 30 is a side view of the mal-distribution member of FIG. 29.

FIG. 33 is a side view of one preferred form of underdrain lateral.

FIG. 34 is a perspective view of the underdrain lateral illustrated in FIG. 33.

FIG. 35 is an enlarged fragmentary perspective view of one end of the underdrain lateral illustrated in FIG. 33.

FIG. 36 is an end view of the underdrain lateral illustrated in FIG. 33.

FIG. 37 is a fragmentary cross-sectional view the underdrain lateral illustrated in FIG. 33.

FIG. 42 is a perspective view of another form of pressure tap member.

DETAILED DESCRIPTION OF THE PREFERRED EMBODIMENTS OF THE INVENTION

The preferred forms of the invention will now be described with reference to FIGS. 1-42. The appended claims are not limited to the preferred forms and no term and/or phrase used herein is to be given a meaning other than its ordinary meaning unless it is expressly stated that the term and/or phrase shall have a special meaning. The term filter as used herein is broadly interpreted to include a device in which at least a portion of the impurities in a liquid are removed including but not limited to a clarifier, a polishing filter and/or a contactor.

FIGS. 1-41

Figure 1:
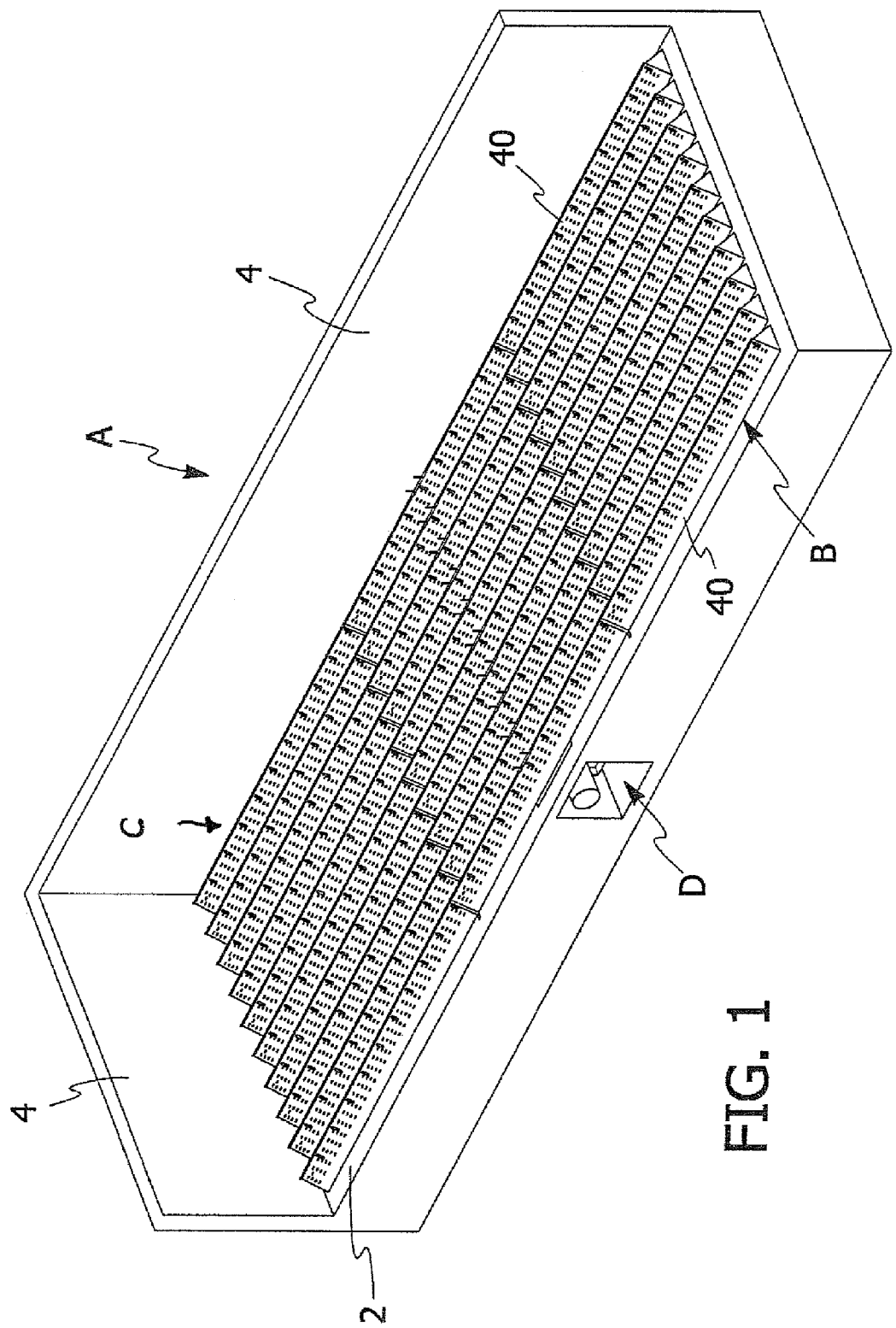
FIG. 1 is a fragmentary perspective view of a filter (with filter media removed) with underdrain laterals formed in accordance with a preferred embodiment of the present invention.

Referring to FIG. 1, a portion of filter A having a floor 2 and four filter walls 4 (only two of which are shown) includes a plurality of underdrain laterals B formed in accordance with a preferred embodiment of the present invention. The filter media has been removed so that the underdrain laterals can be readily seen. It is to be noted that FIG. 1 depicts one of numerous possible configurations of the present invention. It should be noted that the filter A can be formed from any suitable material including but not limited to concrete and stainless steel or other metal. Further, filter A can take any shape as desired including but not limited to square, rectangular and circular. The number of underdrain laterals B that are used in any given underdrain system will depend on the size of the filter.

Preferably, each of the underdrain laterals B are formed from a plurality of blocks C placed end to end with the joints between adjacent blocks C sealed by any suitable sealing method. However, underdrain laterals B may be formed from one long underdrain block C. The underdrain blocks C, in the most preferred embodiment, are formed from stainless steel. However, any suitable material may be used. Preferably, each of the underdrain blocks C are formed in a similar manner and, therefore, only one underdrain block C will be described in detail.

Referring to FIGS. 1 to 11, the preferred form of underdrain block C will now be described. The first of the two main components of underdrain block C is an inner liner 6 seen in for example FIGS. 4 and 5. Preferably, the inner line 6 is formed from a single piece of stainless steel. Apex 8 of liner 6 includes to vertically extending portions that mate flush to each other. The apex 8 can be sealed in any known manner including resistance welding. The base 10 of the liner 6 includes a plurality of openings (not shown) along the length of the liner 6 to receive a washing liquid from center flume D. It should be noted that the present invention is not limited to use with center type flumes but can be used in any filter system including filter systems that do not have a flume. The openings in base 10 preferably receive a gas conduit 12 (see FIG. 2) so that the inner liner 6 can receive a washing gas including but not limited to air from flume D. As readily evident from the above discussion, chamber 14 formed by the inner liner 6 simultaneously receives a liquid and a gas during a backwash using simultaneous liquid and gas. It should be noted, that the present invention is not limited to filter systems employing a simultaneous liquid and gas washing procedure. Rather, the present invention can be used in filter systems employing any of the following washing procedures: (i) a separate liquid and gas washing procedure; (ii) a liquid only washing procedure; (iii) a gas only washing procedure; (iv) and a washing procedure that employs simultaneous liquid and gas for at least a portion of the washing procedure.

A liquid mal-distribution member 16 is formed in each inclined sidewall 18 of liner 6. Preferably, members 16 are positioned below the gas/liquid interface formed in chamber 14 when a simultaneous liquid and gas washing procedure is employed. In the most preferred embodiment, each liquid mal-distribution member 16 is formed by folding an appropriate portion of the single piece of stainless steel so that each liquid mal-distribution member has two abutting segments of stainless steel, an upper segment 20 and a lower segment 22, with a plurality of openings 24 or slots formed in each of the abutting segments of stainless steel. Preferably, each opening in the ripper segment 20 is aligned with an opening formed in the lower segment 22. As explained in more detail below, this arrangement of openings in liquid mal-distribution members 16, will allow a washing liquid to pass through the mal-distribution members 16 after exiting chamber 14 through openings 26 formed in the lower portions of sidewalls 18 of liner 6. The number, shape and spacing between openings 26 may be varied as desired. Moreover, the openings 26 may be knock-outs with only a portion of the knock-out connected to the corresponding sidewall 18 while other portions of the knock-out are detached from the corresponding sidewall 18 creating an opening for fluid to pass through. The knock-outs can be inwardly or outwardly extending with respect to chamber 14, i.e., the knock-outs could extend outwardly from chamber 14 or could extend into chamber 14.

A plurality of gas mal-distribution members 30 are formed in each inclined sidewall 18 of liner 6. Preferably, members 30 are outwardly extending protrusions formed in the single piece of stainless steel forming liner 6. Preferably, members 30 are positioned above the as liquid interface formed in chamber 14 when a simultaneous liquid and gas washing procedure is employed. A plurality of openings 32 are formed around members 30 for allowing a washing gas to exit chamber 14 when a washing gas is use in the washing procedure. The number, size and shape of openings 32 may be vary as desired.

The second main component of blocks C is outer liner 40 as seen in for example, FIGS. 1, 2, 3 and 6. Liner 40 is preferably formed from a single piece of stainless steel. Apex 42 of liner 40 includes two vertically extending portions that mate flush to each other. The apex 42 can be sealed in any known manner including resistance welding. The base 44 of the liner 40 includes a plurality of openings (not shown) along the length of the liner 40. Each of the openings in base 44 is aligned with a corresponding opening in base 10 of liner 6 to allow a washing liquid to flow from the flume D into chamber 14 of liner 6. The openings in base 44 preferably receive a gas conduit 12 (see FIG. 2) so that the inner liner 6 can receive a washing gas including but not limited to air from flume D. Each inwardly inclined sidewall 46 of liner 40 includes a plurality of inwardly extending protrusions 48. Preferably, each inwardly extending protrusion 48 is aligned with and abuts a corresponding outwardly extending protrusion 30 formed in the sidewalls 18 of liner 6.

As seen in FIG. 2, outer liner 40 surrounds inner liner 6 forming two outer chambers 50 and 52 on opposite sides of chamber 14. Chamber 50 can communicate but is not required to communicate with chamber 52 at the apex of the underdrain block C. However, as shown in FIG. 2, chamber 50 does not communicate with chamber 52 at the apex as will 53 formed by apex 8 of liner 6 separates the two outer chambers 50 and 52. However, openings can be readily formed in wall 53 to permit communication between chamber 50 and chamber 52. Each of the chambers 50 and 52 have an upper compartment 54 formed above member 16 and a lower compartment 56 formed below member 16. Each of the lower compartments 56 receives a washing liquid from inner chamber 14 through openings 26 during a washing procedure including a washing liquid.

Openings may be formed in sidewalls 46 of outer liner 40 below members 16 to allow some liquid in lower compartments 56 to directly enter the filter bed. The filter bed may include one or more layers of filter media supported by one or more layers of gravel. The bulk of the washing liquid in lower compartments 56 will travel through the openings 24 in the corresponding distribution member 16 and enter the corresponding upper compartment 54. The washing liquid exits upper compartment 54 through a plurality of openings or slots 60. Forcing the bulk of the washing liquid entering lower compartment 56 through members 16 before exiting block C, directly results in a significant reduction of mal-distribution of the washing liquid.

When a washing liquid and washing gas are simultaneously used to wash a filter bed, a gas/liquid interface will be formed in chamber 14 above members 16. The gas will exit chamber 14 through the openings 32 formed in sidewalls 18 above members 16 into upper compartments 54. A liquid/gas interface will in turn be formed in each of the upper compartments 54. The washing gas will exit compartments 54 above the corresponding gas/liquid interface and pass into the filter bed. However, prior to exiting upper compartments 54, the washing gas travels around the mating protrusions 30 and 48 and upwardly through the channels formed between adjacent pairs of mating protrusions 30 and 48. In this manner, mal-distribution of the washing gas is greatly reduced.

Figure 6:
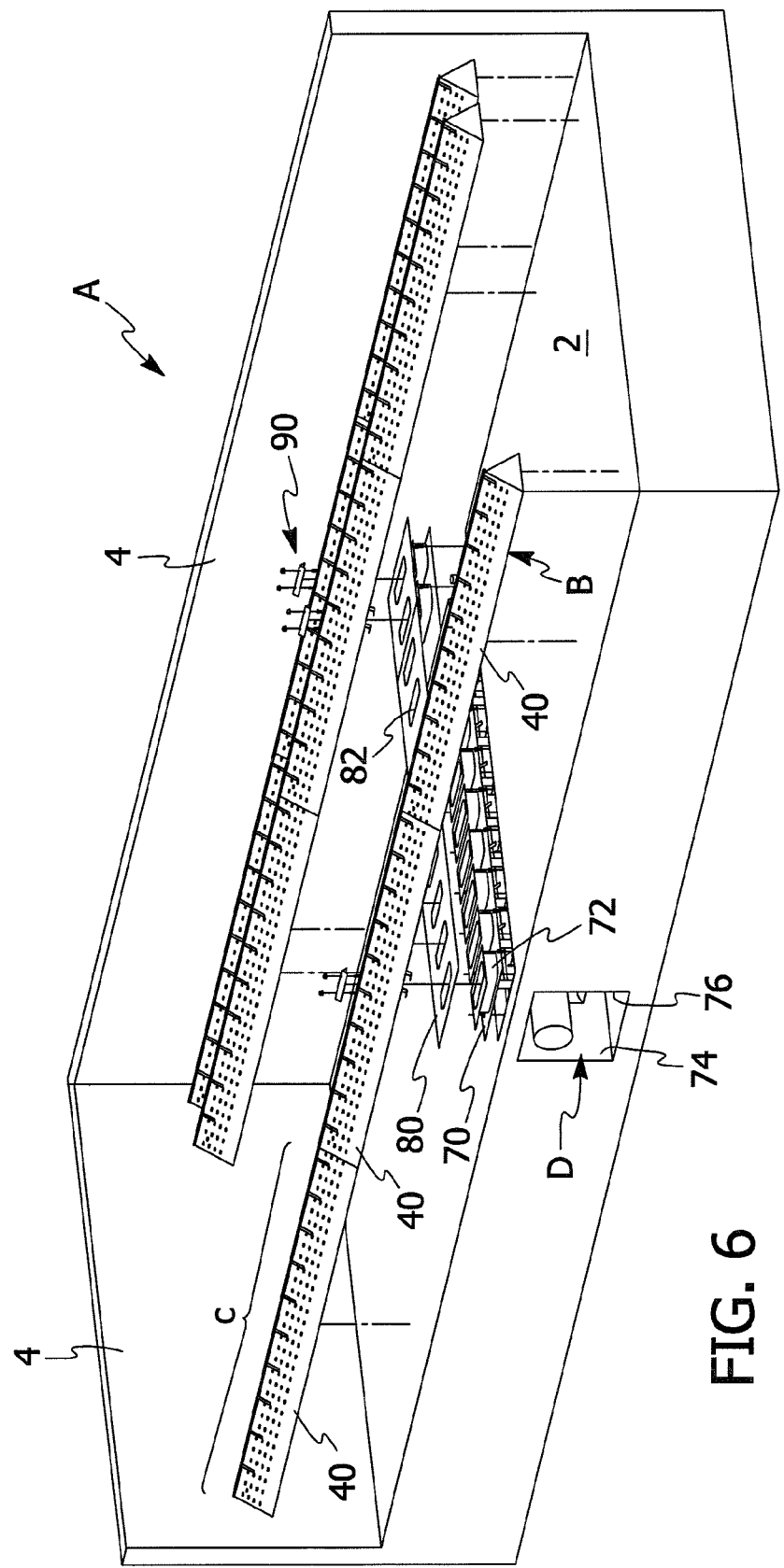
FIG. 6 is an exploded view of the embodiment illustrated in FIG. 1.

Referring to FIGS. 2 and 6 to 11, one preferred manner of anchoring underdrain blocks C will now be described. Referring to FIGS. 6 and 8, a flume distribution plate 70 having a plurality of fluid guides or collars 72 extend upwardly from the flume distribution plate. Each fluid guide or collar 72 is associated with one underdrain lateral as shown in FIGS. 2 and 7. While these figures depict the guide or collar 72 disposed outside of the corresponding block C, it should be noted that collar 72 can extend in the corresponding underdrain block. In the case of an existing flume, the flume distribution plate 70 can be fixed to sidewalk 74 and 76 of flume D by angle brackets 79 and bolts illustrated in FIG. 8. However, it should be readily appreciated that numerous other fastening arrangements may be used. Grout 78 is preferably poured around the collars 72 to provide a tight seal between the flume and plate 70. A sealing plate 80 (FIG. 6) is placed over plate 70 as shown in FIG. 6. Sealing plate 80 has a plurality of openings 82 that align with collars 72. Preferably, sealing plate 80 is not fixed to plate 70. Sealing plate 80 enhances the seal around flume D. In new installations, where the filter housing is formed from concrete, plate 70 may be embedded directly in the floor of the filter adjacent or in the flume.

The anchor assembly of the present invention uses each of the collars 72 to create a lower anchor point in the flume to secure each underdrain lateral B to the floor 2 of the filter. Referring to FIGS. 2 and 6 to 11, the preferred anchor assembly includes a top support plate 90 that mates with the upper portion of block C and a pair of lower support clips 92 that engage an inner surface of collars 72 as seen in for example FIG. 2. An internal mounting frame 94 is disposed in chamber 14 of liner 6 and seats on the inner surface of the base 10. While FIG. 11 shows mounting frame 94 in an exploded view, the elements 91, 93, 95 making up this member are fixed to each other by welding or any other suitable means. Two threaded bolts 97 pass through openings 96 and 98 of plate 90 and openings 100 and 102 of block C. Three nuts 104, 106 and 108 are associated with each bolt 97 to firmly anchor block C to the floor 2 of the filter.

FIGS. 16 and 17

Another preferred anchoring assembly is shown in FIGS. 16 and 17. This anchoring system is similar to the assembly described above and, therefore, only the differences will be described in detail. Like elements are given the same references numerals. In this assembly, nuts 106 and internal mounting frame 94 have been omitted. A plurality of internal support members 110 (three of which are shown in FIG. 16) are positioned in chamber 14. The support members 110 include two inclined sidewalk 112 that mate with the sidewalk of liner 6 to provide internal support. The support members 110 each include leg 114 extending inwardly from the corresponding sidewall 112. As seen in FIG. 17, a large gap exists between legs 114 to allow for the free flow of a washing fluid into block C.

FIGS. 12 Through 15

FIGS. 12 through 15 illustrate alternative means to connect the underdrain block to a washing fluid supply where a flume is not used as the washing fluid supply source. FIGS. 12 and 13 illustrate an end cap 118 having an upper air opening 120 and a lower liquid 122 opening to allow the underdrain lateral B to be readily connected to an air pipe and a water pipe.

FIG. 14 illustrates an end cap 124 having a preformed air collar 126 and a preformed water collar 128 to assist in connecting both water and air supplies to underdrain lateral B.

FIG. 15 illustrates an end cap 130 having a large water collar 132 to facilitate connection of the underdrain lateral B to a water supply.

Figure 18:
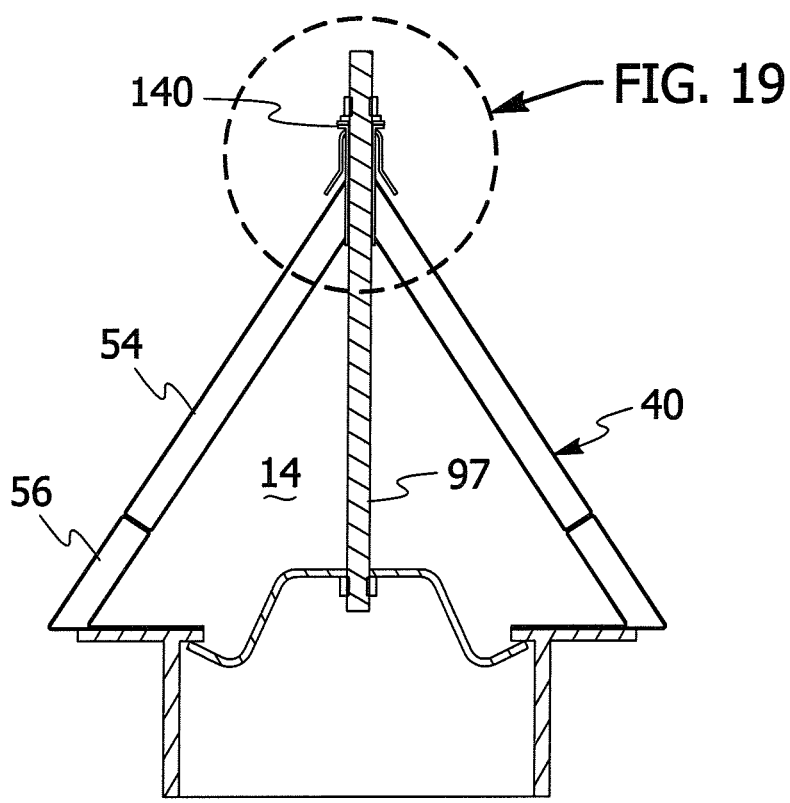
FIG. 18 is a cross-sectional view of a preferred form of misalignment prevention collar.
Figure 19:
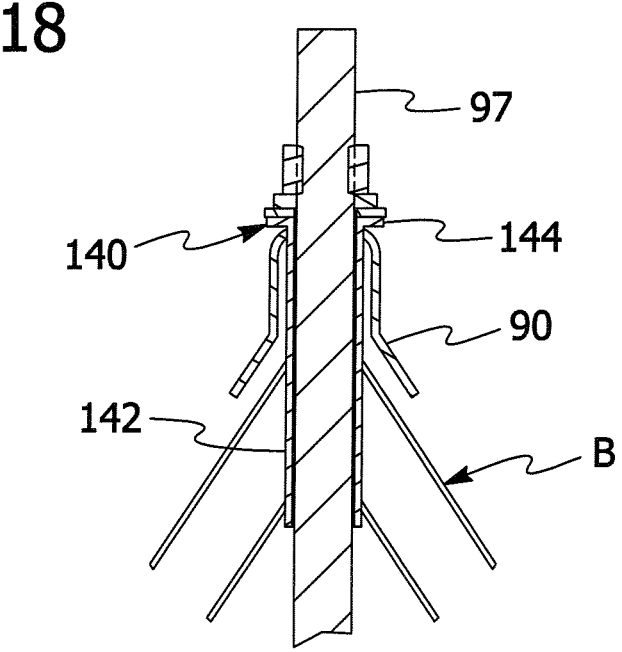
FIG. 19 is an enlarged cross-sectional view of the portion of FIG. 18 within the dashed lines.
Figure 20:
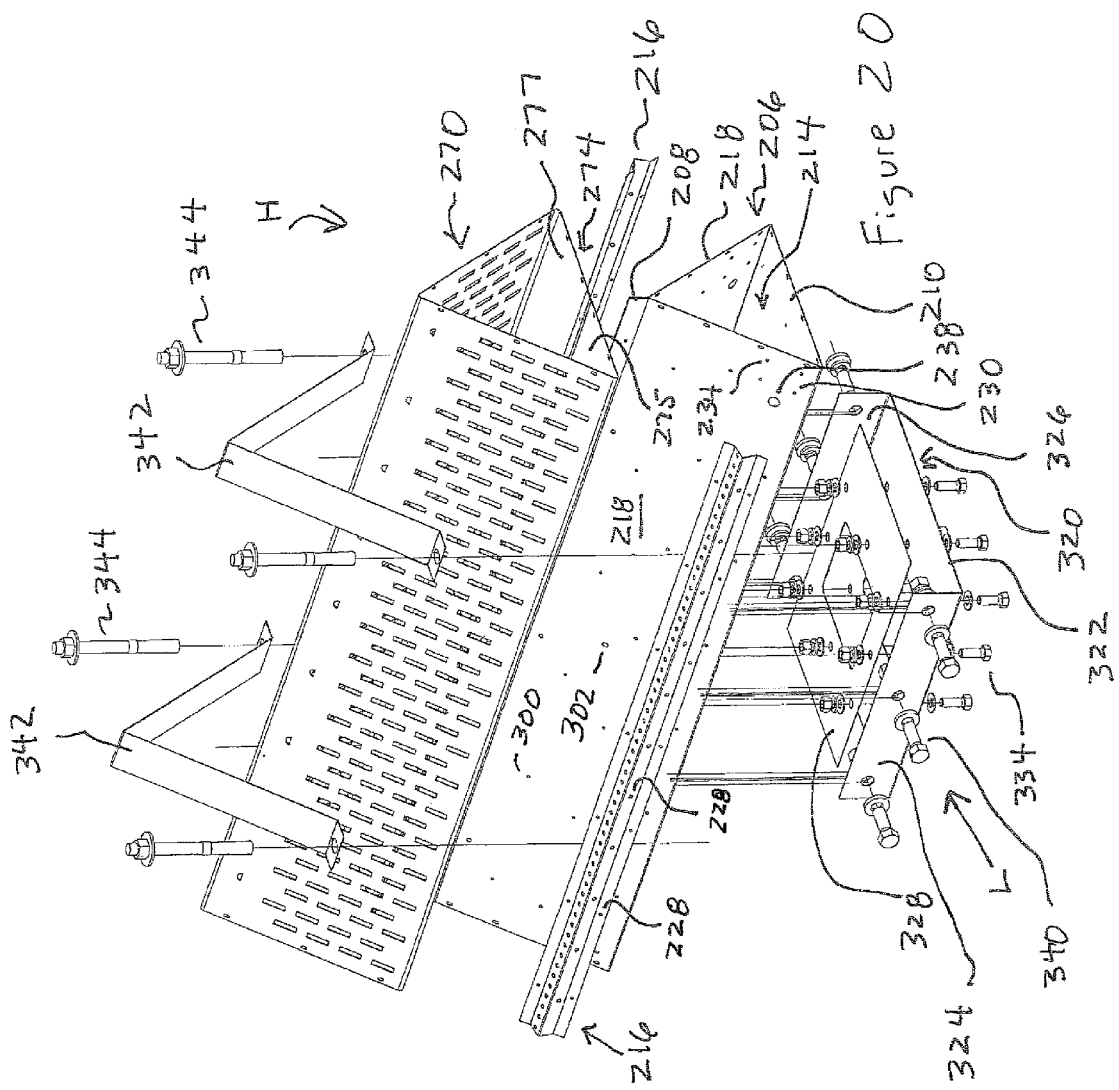
FIG. 20 is a perspective view of an underdrain lateral block and support assembly formed in accordance with another preferred embodiment of the present invention as seen from the side.
Figure 21:
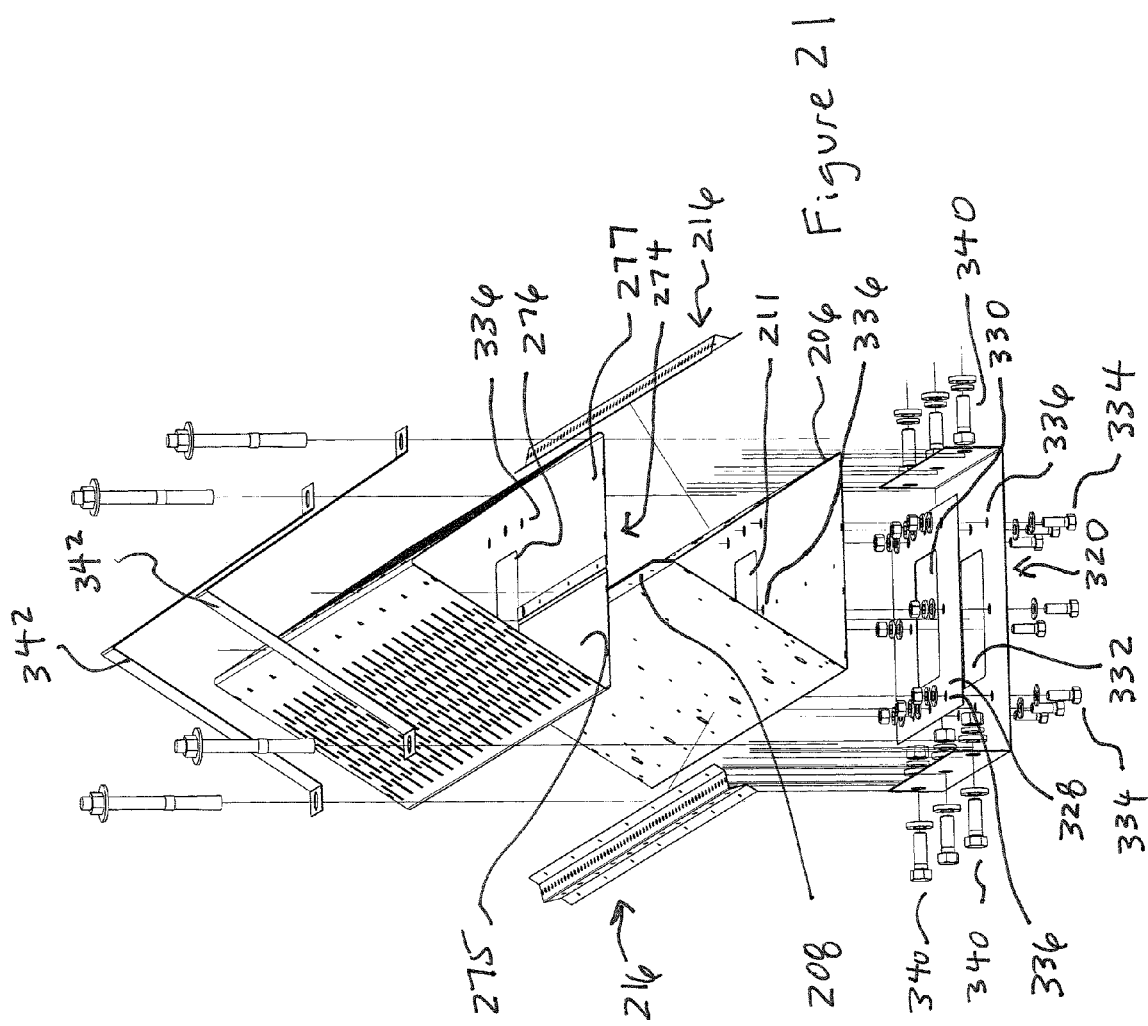
FIG. 21 is a perspective view of the underdrain lateral block and support assembly illustrated in FIG. 20 as seen from a different vantage point.
Figure 22:
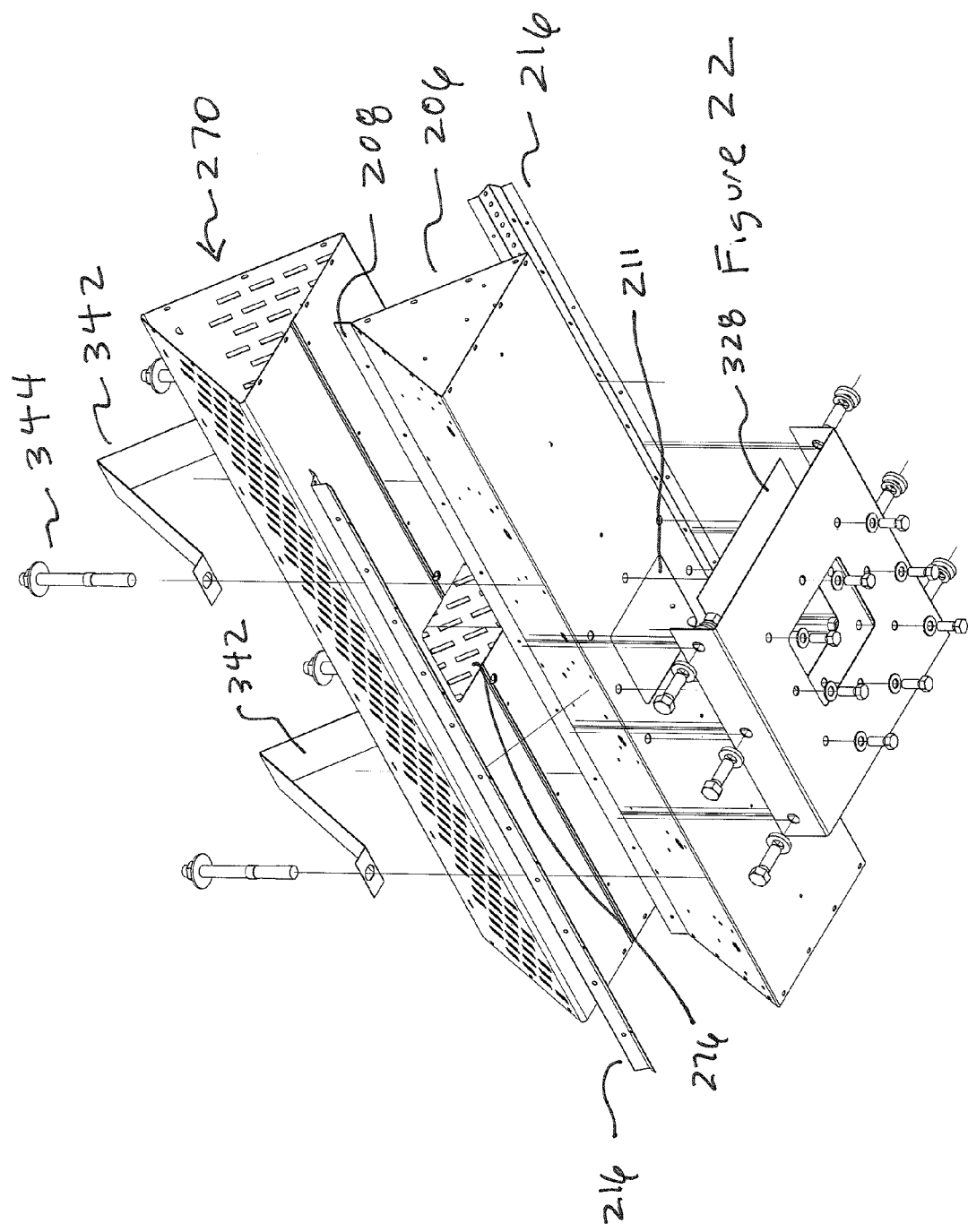
FIG. 22 is a perspective view of the underdrain lateral block and support assembly illustrated in FIG. 20 as seen from a different vantage point.

FIGS. 18 and 19

FIGS. 18 and 19 disclose a preferred misalignment prevention collar 140 that can be used with the preferred forms of the underdrains disclosed herein. Collar 140 includes a downwardly extending cylindrical sleeve 142 that receives threaded bolt 97 and maintain the bolt in a vertical axis preventing any misalignment of the bolt 97. Collar 140 further includes a circular lip 144 disposed at the top of apex of outer liner 40. Lip 144 engages top support plate 90 as the anchor assembly is tightened to securely connect the underdrain laterals B to the floor 2 of the filter. It should be noted that collar 140 can take many different forms and can be positioned in other areas including the bottom of the underdrain blocks C.

FIGS. 20 Through 42

Figure 23:
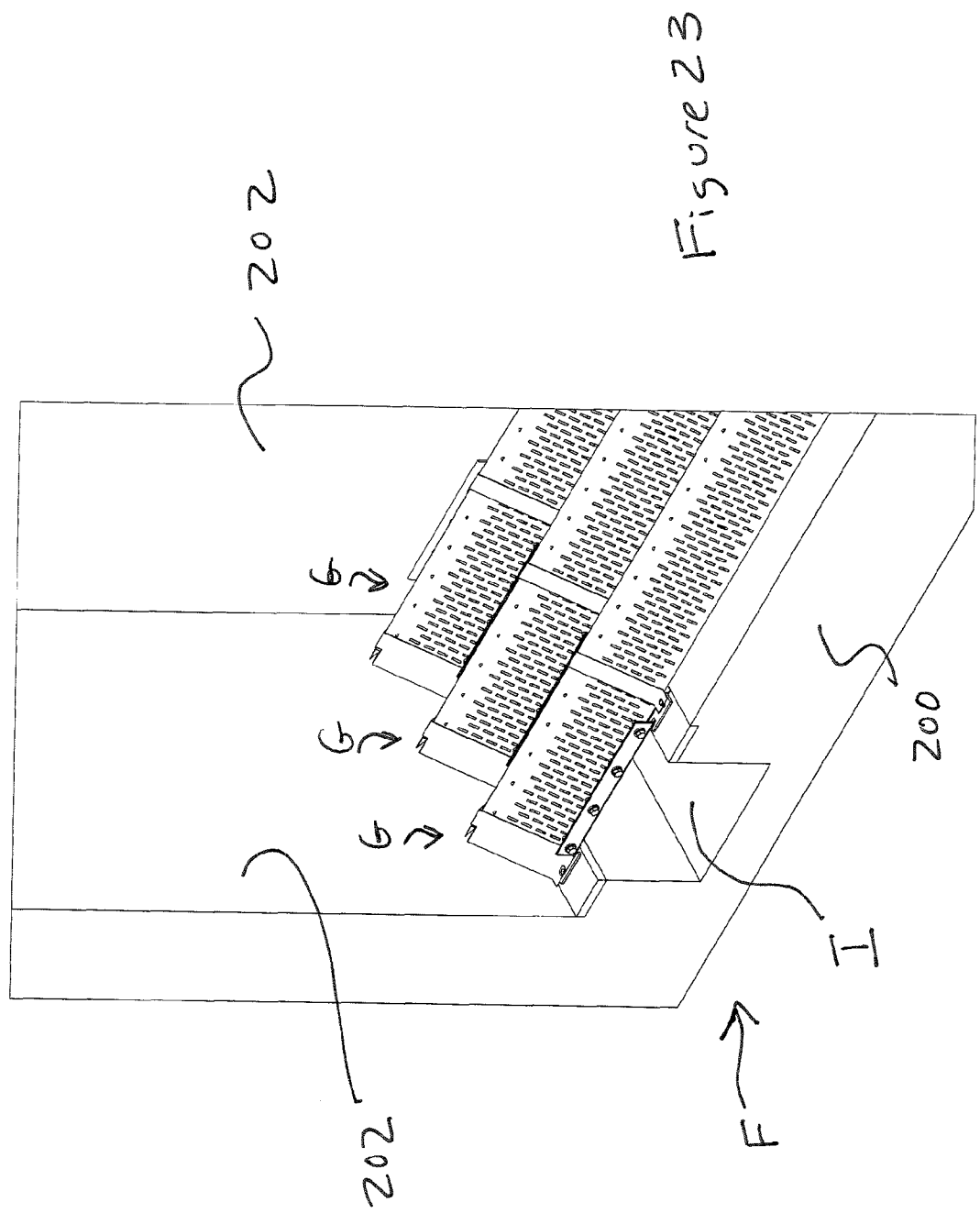
FIG. 23 is a fragmentary perspective view of a filter housing having three underdrain laterals formed from the underdrain block illustrated in FIG. 20.
Figure 31A:
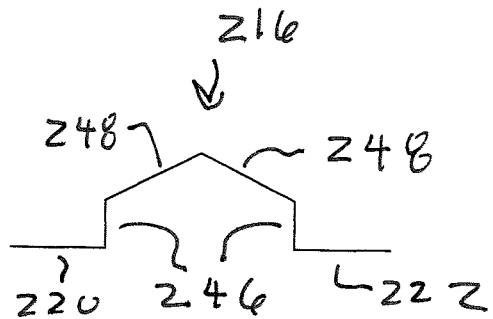
FIGS. 31A THROUGH 31E illustrate several of many possible different configurations for the mal-distribution member illustrated in FIGS. 29 and 30.
Figure 31B:
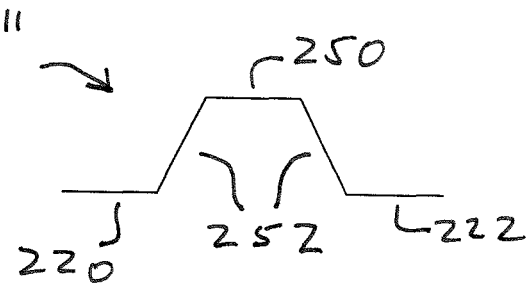
Figure 31C:
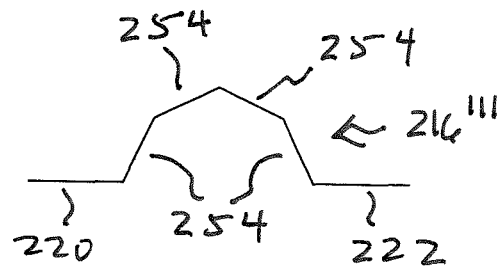
Figure 31D:
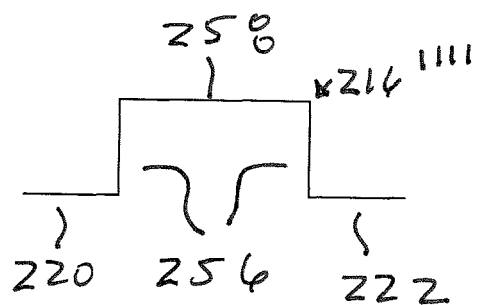
Figure 31E:
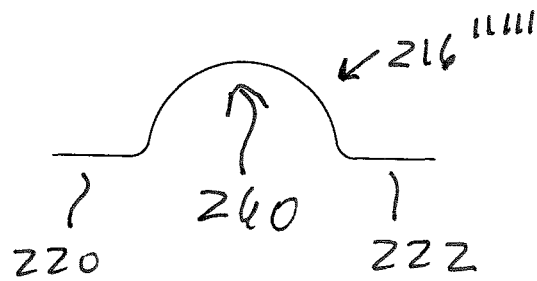
Figure 32:
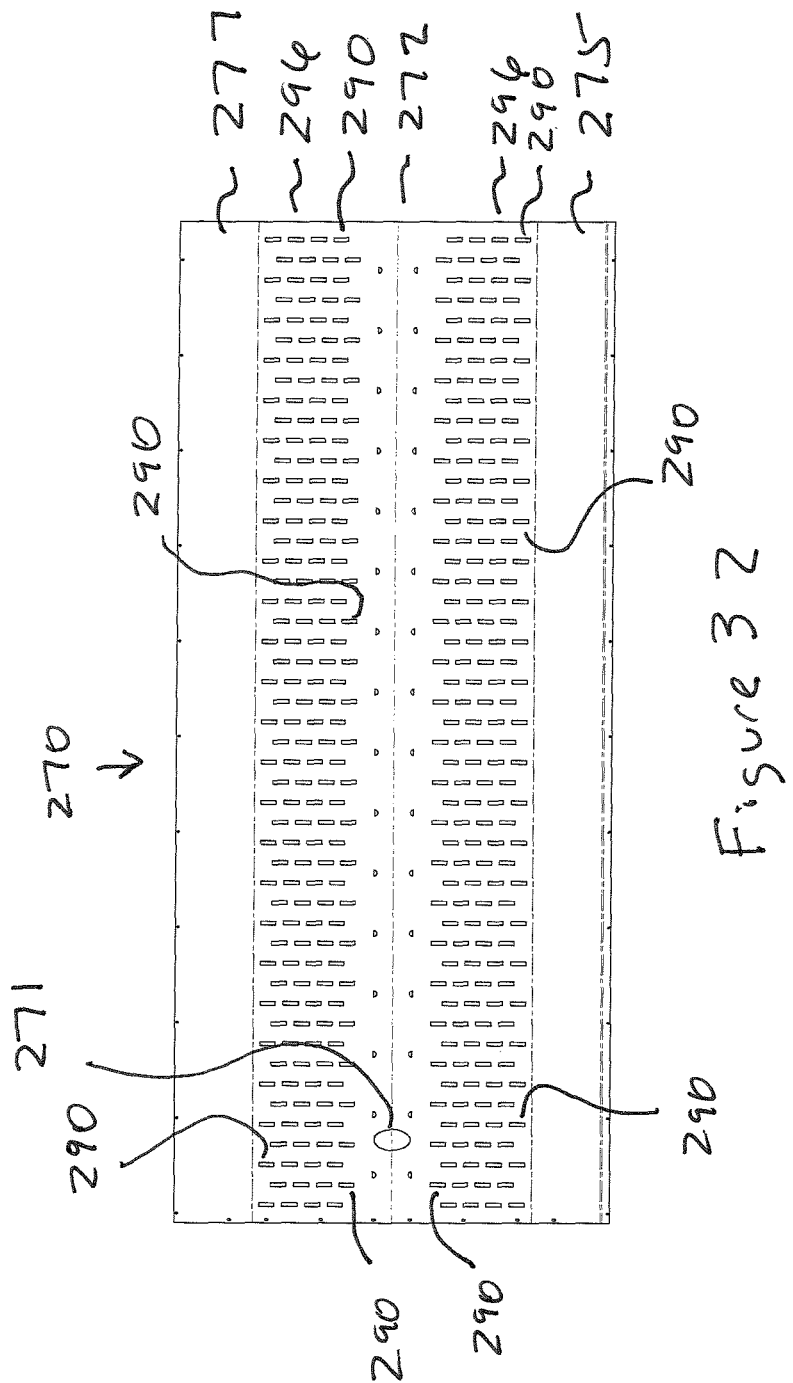
FIG. 32 is a plan view of the outer liner in blank form (i.e., prior to bending) of the underdrain lateral block illustrated in FIG. 20.

Referring to FIGS. 23 and 24, a portion of filter F having a floor 200 and four filter walls 202 (only two of which are shown) includes a plurality of underdrain laterals G formed in accordance with a preferred embodiment of the present invention. The filter media has been removed so that the underdrain laterals can be readily seen. It is to be noted that FIGS. 23 and 24 depict one of numerous possible configurations of the present invention. It should be noted that the filter F can be formed from any suitable material including but not limited to concrete and stainless steel or other metal. Further, filter F can take any shape as desired including but not limited to square, rectangular and circular. The number of underdrain laterals G that are used in any given underdrain system will depend on the size of the filter.

Preferably, each of the underdrain laterals G are formed from a plurality of blocks H placed end to end with the joints between adjacent blocks H sealed by any suitable sealing method. However, underdrain laterals G may be formed from one long underdrain block H. The underdrain blocks H, in the most preferred embodiment, are formed from stainless steel. However, any suitable material may be used. Preferably, each of the underdrain blocks H are formed in a similar manner and, therefore, only one underdrain block H will be described in detail.

Referring to FIGS. 20 to 30 and 32 to 42, the preferred form of underdrain block H will now be described. The first of the two main components of underdrain block H is an inner liner 206 seen in for example FIGS. 20 to 22 and 25 to 28. Preferably, the inner liner 206 is formed from a single piece of stainless steel. Inner liner 206 is depicted in blank form (i.e., prior to bending) in FIG. 25. Apex 208 of liner 206 includes two vertically extending portions 205 and 207 that mate flush to each other. The apex 208 can be sealed in any known manner including resistance welding. The base 210 of the liner 206 includes a centrally located opening 211 to receive washing liquid from flume I. It should be noted that only the underdrain blocks H disposed directly above flume I need to include central opening 211 as the washing liquid will enter the underdrain laterals G through openings 211 and travel in the inner liner 206 to the opposite end of the underdrain laterals G.

Referring to FIGS. 26 and 36, preferably a gas conduit 212 extends through opening 213 so that the inner liner 206 can receive a washing gas including but not limited to air from a supply source. It should be noted that air could be supplied from flume I located below the underdrain laterals G as shown in for example, FIG. 2. It should further be noted that the present invention is not limited to use with filters having any type of flume. For example, the washing fluid, be it a liquid (e.g. water) or a gas (e.g., air) can be supplied through the ends of the underdrain laterals G as shown in FIGS. 12 through 15 and 34 to 36.

As is readily evident from the above discussion, chamber 214 formed by inner liner 206 simultaneously receives a liquid and a gas during a backwash or washing cycle that utilizes simultaneous liquid and gas. It should be noted, that the present invention is not limited to filter systems employing a simultaneous liquid and gas washing procedure. Rather, the present invention can be used in filter systems employing any of the following washing procedures: (i) a separate liquid and gas washing procedure; (ii) a liquid only washing procedure; (iii) a gas only washing procedure; (iv) and a washing procedure that employs simultaneous liquid and gas for at least a portion of the washing procedure/cycle.

A washing fluid mal-distribution member 216 is attached by fasteners (e.g. rivets) to each inclined sidewall 218 of liner 206 to prevent mal-distribution of a washing fluid. Preferably, members 216 are positioned below the gas/liquid interface formed in chamber 214 when a simultaneous liquid and gas washing procedure is employed and, therefore, the mal-distribution member will serve to prevent mal-distribution of a washing liquid (e.g., water). However, the washing fluid can be a gas. For example, where only a washing gas is used during at least a portion of the washing cycle then the mal-distribution member will serve to prevent mal-distribution of a washing gas (e.g., air). In the most preferred embodiment, each mal-distribution member 216 includes a pair of attachment feet or flanges 220 and 222 and outwardly extending and angled walls 224 and 226. Preferably, mal-distribution member 216 is formed from a blank (see FIG. 29) of a single piece of stainless steel. Foot or flange 220 includes a plurality of openings 228 that align with openings 230 of sidewalk 218 of inner liner 206 when mal-distribution member 216 is mounted on each sidewall 218. Openings 228 and 230 receive a fastener (e.g., a rivet) to secure mal-distribution member 216 on the corresponding sidewall 218. Similarly, foot or flange 222 includes a plurality of openings 232 that align with openings 234 of sidewalls 218 of inner liner 206 when mal-distribution member 216 is mounted on each side van 218. Openings 232 and 234 receive a fastener (e.g., a rivet) to secure mal-distribution member 216 on the corresponding sidewall 218.

Referring to FIGS. 30 and 37, inclined and outwardly extending walls 224 and 226 and the corresponding portion of sidewall 218 collectively form a chamber or sub-chamber 236. Openings 238 and 240 in liner 206 allow a washing fluid to pass from chamber 214 into chamber 236 during a washing cycle. Openings 242 in wall 224 and openings 244 in wall 226 allow a washing fluid to exit chamber 236 during a washing cycle. Preferably, the spacing between adjacent openings 242 is significantly greater than the spacing between openings 244. However, the number, shape and spacing between openings 242 may be varied as desired. Similarly the number, shape and spacing between openings 244 may be varied as desired.

Mal-distribution member 216 can take many forms including but not limited to those illustrated in FIG. 31A through FIG. 31E. For example, mal-distribution member 216' illustrated in FIG. 31A includes two vertically extending walls 246 in addition to the inclined walls 248. Mal-distribution member 216'' illustrated in FIG. 31B includes a horizontally extending wall 250 in addition to the inclined walls 252. Mal-distribution member 216''' illustrated in FIG. 31C includes four inclined walls 254. Mal-distribution member 216'''' illustrated in FIG. 31D includes two vertically extending walls 256 in addition to one horizontally extending wall 258. Mal-distribution member 216''''' illustrated in FIG. 31E includes one arcuate wall 260 connected to flanges 220 and 222.

The second main component of blocks H is outer liner 270 as seen in for example, FIGS. 32 to 37. Preferably, the outer line 270 is formed from a single piece of stainless steel. Outer liner 270 is depicted in blank form (i.e., prior to bending) in FIG. 32. An opening 271 is formed in apex 272 of liner 270 so that conduit 212 can extend through the upper portion of liner 270. Referring to 21 and 22, base 274 of the liner 270 includes an opening 276 aligned with opening 211 of inner liner 206 so that a washing fluid from flume I can flow upwardly through opening 276 and subsequently through opening 211 into chamber 214. It should be noted that only the underdrain blocks H disposed directly above flume I need include central opening 276. Referring to FIGS. 20 to 22 and FIG. 32, base 274 is formed by wall portions 275 and 277. Wall portion 275 may be connected in a sealed manner to wall portion 277 using any suitable sealing technique including but not limited to resistance welding.

As seen in FIGS. 36 and 37, outer liner 270 surrounds inner liner 206 forming two outer chambers 280 and 282 on opposite sides of chamber 214. Chamber 280 can communicate but is not required to communicate with chamber 282 at the apex of the underdrain block H. However, as shown, chamber 280 does not communicate with chamber 282 at the apex as walls 205 and 206 formed by apex 208 of inner liner 206 separates the two outer chambers 280 and 282. However, openings can be readily formed in walls 205 and 206 to permit communication between chamber 280 and chamber 282. Each of chambers 280 and 282 have an upper compartment 284 formed above member 216 and a lower compartment 286 formed below member 216. Each of the lower compartments 286 receives a washing liquid from sub-chamber 236 through openings 242 during a washing procedure including a washing liquid. Each of the upper compartments 284 receives a washing liquid from sub-chamber 236 through openings 244 during a washing procedure including a washing liquid.

Some of openings 290 are formed in sidewalk 296 of outer liner 270 below members 216 to allow some liquid in lower compartments 286 to directly enter the filter bed. Other of openings 290 are formed above members 216 to allow washing fluids in upper compartments 284 to directly enter the filter bed from the upper compartments 284. Openings may be formed in base 274 of outer liner 270 below lower compartments 286 so that a washing fluid (e.g., water) exiting lower compartments through base 274 can pass between base 274 and floor 200 of the filter so that any bacteria or other undesirable substance located adjacent or between the base 274 and floor 200 can be flushed out. The filter bed may include one or more layers of filter media supported by one or more layers of gravel.

When a washing liquid and washing gas are simultaneously used to wash a filter bed, a gas/liquid interface will typically be formed in chamber 214 above members 216. Gas will enter chamber 214 through conduit 212. The gas will typically exit chamber 214 and enter upper compartments 284 through the openings 300 and 302 formed in sidewalk 218 of inner liner 206 above members 216. Openings 302 may be larger than openings 300. It should be noted that the size, spacing, number and configuration of openings 300 and 302 may be varied as desired.

A liquid/gas interface will in turn be formed in each of the upper compartments 284. The washing gas will exit upper compartments 284 above the corresponding gas/liquid interface and pass into the filter bed through openings 290 formed in sidewalk 296 of outer liner 270 above members 216. Referring to FIG. 37, members 216 may be spaced inwardly from the inner surface of sidewalls 296 of outer liner 270. This will allow liquid from lower compartments 286 to travel upwardly into the corresponding upper compartments 284.

Referring to FIGS. 20 to 24 a preferred form of support assembly L for supporting and connecting inner liner 206 to outer liner 270 will now be described. Support assembly L is configured to prevent relative movement between the inner liner 206 and the outer liner 270. Support assembly L preferably includes a substantially U-shaped base plate 320 including base 322 and two vertically extending walls 324 and 326 extending upwardly from opposite sides of base 322. Outer liner 270 is supported directly on base plate 320 between walls 324 and 326. Support assembly L further includes inner liner plate 328 which is disposed in inner liner 206 such that opening 330 of plate 328 is aligned with opening 211 of inner liner 206. Plate 320 includes an opening 332 that is aligned with openings 330 and 211 to allow a washing liquid to flow from flume I to chamber 214 of inner liner 206. A plurality of vertically extending fasteners 334 pass through a plurality of openings 336 (eight openings are shown) surrounding each of openings 332, 276, 211, 330 to securely connect inner liner 206 and outer liner 270 to the support assembly L in such a manner that inner liner 206 cannot move relative to outer liner 270. Fasteners 334 as illustrated include a bolt, a nut and a plurality of washers. It will be readily appreciated that any suitable fastener may be used. Referring to FIGS. 23 and 24, support assemblies L of adjacent underdrain laterals G are connected to each other by horizontally extending fasteners 340 passing through abutting vertically extending walls of adjacent plates 320. Anchors 342 are positioned on underdrain blocks H at spaced intervals along the length of the underdrain laterals G to anchor underdrain laterals G to filter floor 200.

Bolts or all threads 344 connect the anchors 342 to floor 200.

Figure 38:
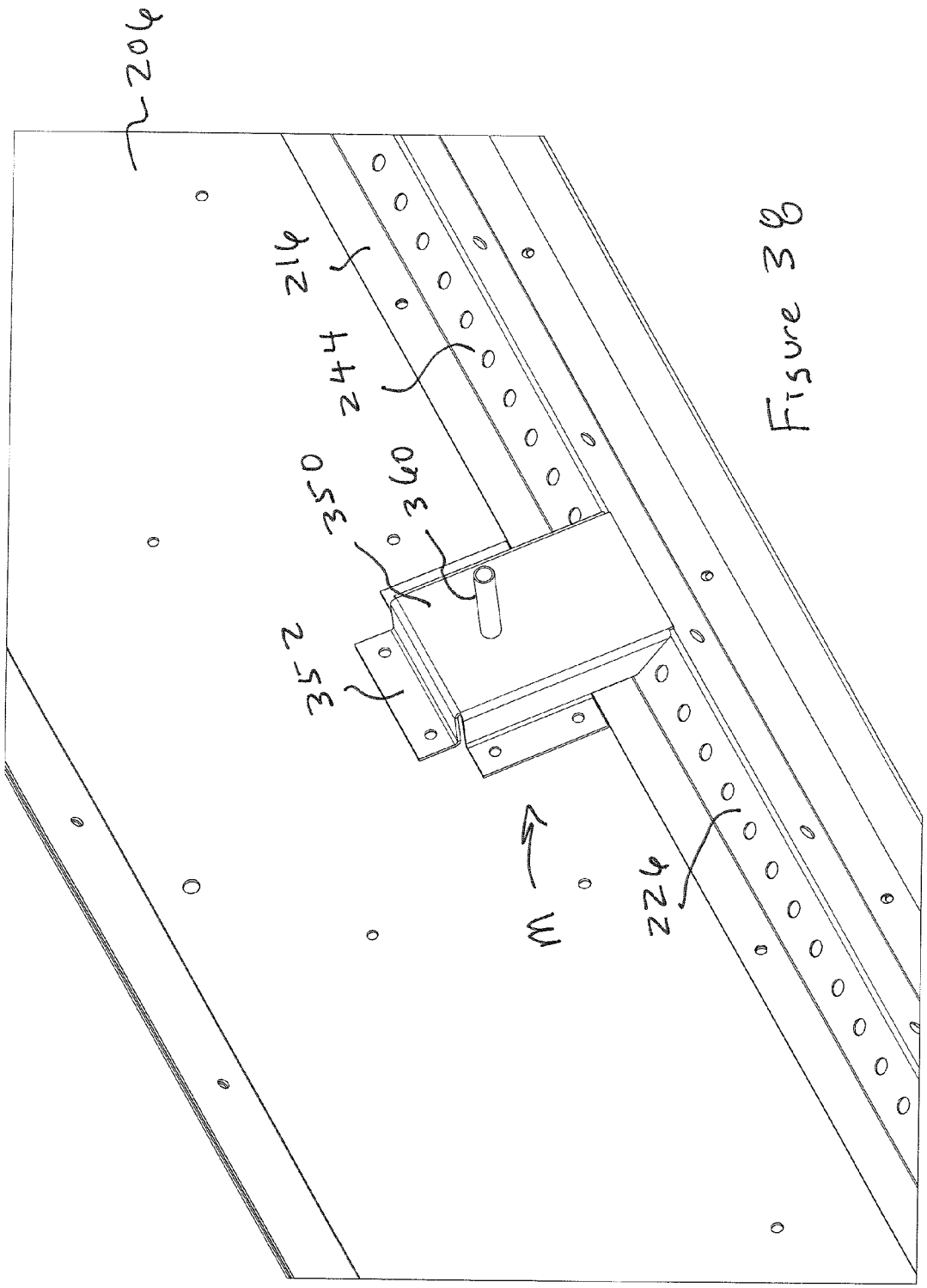
FIG. 38 is a perspective view of the pressure tap member connected to the mal-distribution member and inner liner.
Figure 39:
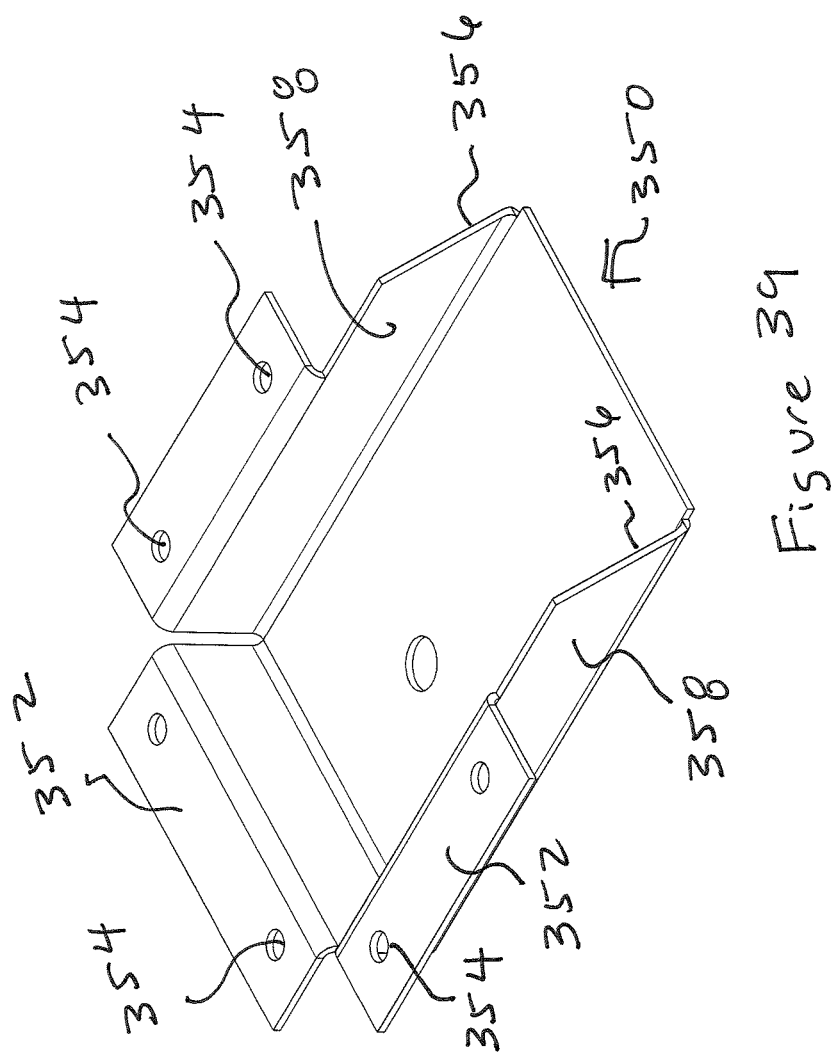
FIG. 39 is a perspective view of the body of the pressure tap member.
Figure 40:
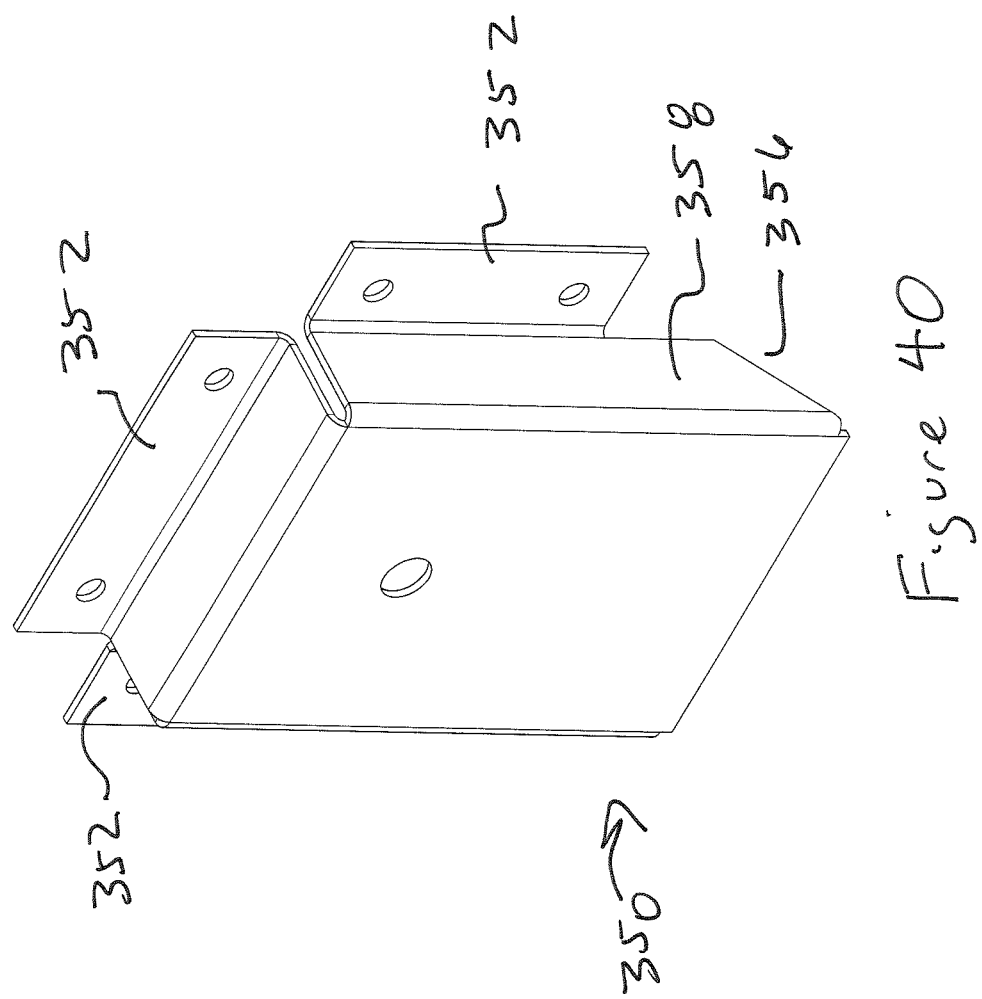
FIG. 40 is a perspective view of the body of the pressure tap member taken from a different vantage point than FIG. 39.
Figure 41:
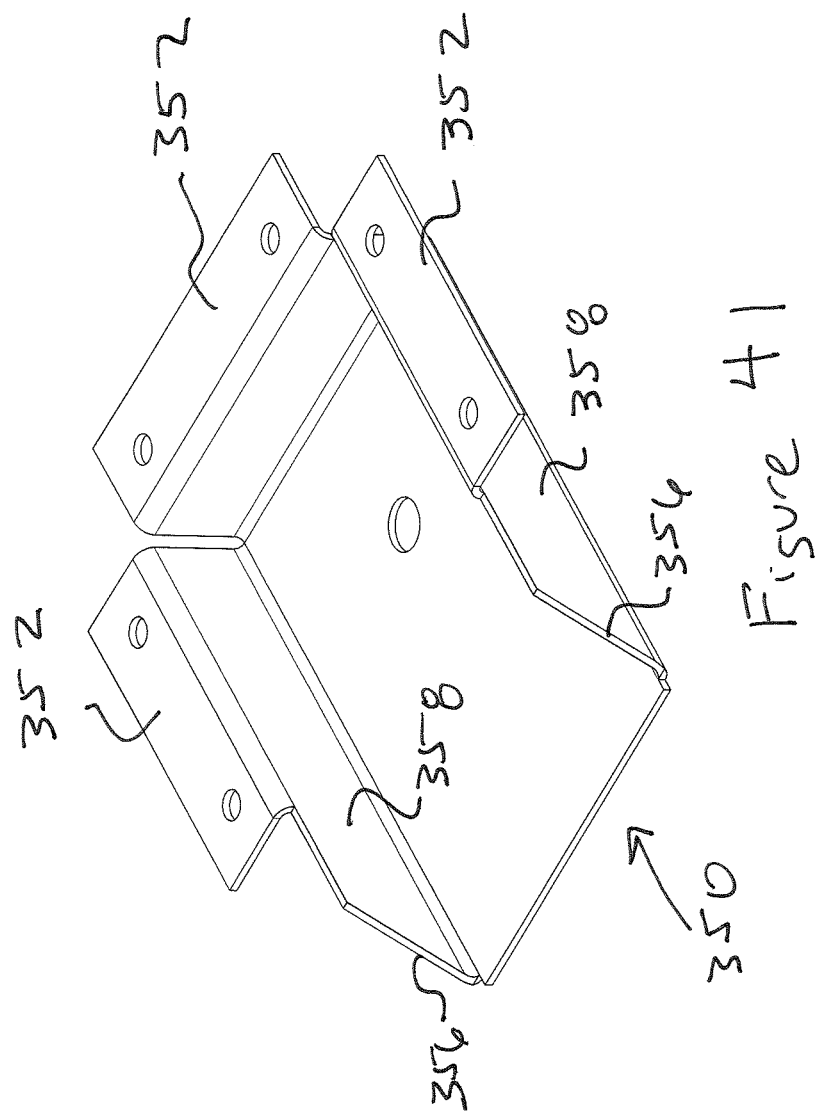
FIG. 41 is a perspective view of the body of the pressure tap member taken from a different vantage point than FIG. 39.

Referring to FIGS. 38 to 41, a fluid pressure tap member M will now be described. Fluid pressure tap member M includes a body 350 having a plurality of attachment feet or flanges 352 for securing member M to the inner liner 206 as shown in FIG. 38. Rivets or other fasteners pass through openings 354 in flanges 352 to connect body 350 to inner liner 206. Tapered portion 356 of sidewalls 358 of body 350 mates with inclined wall 226 of member 216. A pressure tap 360 extends outwardly from body 350 and passes through a corresponding opening (not shown) in outer liner 270 so that a conduit extending from a pressure monitor can be readily connected to the pressure tap 360. A sealant may be applied around the periphery of body 350 to create a sealed monitoring chamber between body 350 and the inner liner 206. A washing fluid enters the sealed chamber formed in part by body 350 from sub-chamber 236 through openings 244 in mal-distribution member 216. The washing fluid is then directed to the pressure monitor through the conduit (not shown) connected to tap 360 to ascertain the pressure of the washing fluid. Preferably, a plurality of fluid pressure tap members M are uniformly spaced (e.g., every eight feet) along the underdrain laterals G. By monitoring the pressure of the washing fluid along the length of the underdrain laterals it is possible to determine if mal-distribution of the washing fluid is occurring and/or where such mal-distribution is occurring. Where simultaneous liquid and gas is used in the washing cycle and the gas/liquid interface is located above member 216 then the pressure of the washing liquid will be monitored by member M and the associated pressure monitor. Where only gas is used during a washing cycle, then gas pressure will be monitored by member M and the associated pressure monitor.

Referring to FIG. 42, a pair of pressure tap members 380 and 382 are illustrated that may be used in place of and/or with member M. Alternatively, members 380 and 382 may be used prior to the underdrain lateral being installed in a filter housing. Members 380 and 382 are configured to be inserted into or over the end of inner liner 206 and outer liner 270, respectively. Tap 384 extends through both members 380 and 382 so that a washing fluid can pass from the inner liner 206 to pressure monitor connected to tap 384. Tap 386 extends through only member 382 so that a washing fluid can pass from the corresponding outer chamber formed between inner liner 206 and outer liner 270.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for use in a filter system for filtering water or wastewater, said apparatus comprising:
   (a) at least one underdrain lateral having a plurality of openings, said at least one underdrain lateral including at least one outer wall and at least one inner wall forming at least a first chamber and a second chamber, said first chamber being in fluid communication with said second chamber through at least one of said plurality of openings, said at least one outer wall including a first outer sidewall, a second outer sidewall and a bottom outer wall, said first outer sidewall and said second outer sidewall being inclined inwardly such that said first outer sidewall forms an acute angle with said bottom outer wall and said second outer sidewall forms an acute angle with said bottom outer wall;
   (b) a first sub-chamber for receiving and directing a washing fluid, said first sub-chamber being formed in said first chamber; and,
   (c) a first mal-distribution member being disposed in said first chamber for preventing mal-distribution of a washing fluid, said first mal-distribution member and at least a portion of said at least one inner wall forming at least a portion of said first sub-chamber.

2. An apparatus as set forth in claim 1, wherein:
   (a) said first chamber is a secondary chamber receiving a washing fluid from said second chamber during a washing cycle, said second chamber being a primary chamber; and,
   (b) said first mal-distribution member includes a plurality of openings.

3. An apparatus as set forth in claim 2, wherein:
   (a) at least a portion of said first mal-distribution member is disposed below a liquid/air interface formed in said primary chamber when both liquid and air are used simultaneously during a washing cycle.

4. An apparatus as set forth in claim 1, wherein:
   (a) at least a portion of said first mal-distribution member is spaced from said at least one outer wall and said at least one inner wall.

5. An apparatus as set forth in claim 1, wherein:
   said first outer sidewall and said bottom outer wall are formed from a single piece of material.

6. An apparatus as set forth in claim 1, wherein:
   (a) a single piece of metal forms said first mal-distribution member.

7. An apparatus as set forth in claim 1, wherein:
   (a) said at least one inner wall includes a first inner sidewall and a second inner sidewall, said first chamber is formed between said first inner sidewall and said first outer sidewall and a third chamber is formed between said second inner sidewall and said second outer sidewall, said first inner sidewall and said second inner sidewall being inclined inwardly such that said first inner sidewall forms an acute angle with said bottom outer wall and said second inner sidewall forms an acute angle with said bottom outer wall.

8. An apparatus as set forth in claim 7, wherein:
   (a) said second chamber is disposed between said first chamber and said third chamber.

9. An apparatus as set forth in claim 8, further including wherein:
   (a) a second sub-chamber for receiving and directing a washing fluid, said second sub-chamber being formed in said third chamber; and,
   (c) a second mal-distribution member being disposed in said third chamber for preventing mal-distribution of a washing fluid, said second mal-distribution member and at least a portion of said second inner sidewall forming at least a portion of said second sub-chamber wherein a single piece of material forms said second mal-distribution member.

10. An apparatus as set forth in claim 9, wherein:
    (a) said second mal-distribution member includes a plurality of openings.

11. An apparatus as set forth in claim 10, wherein:
    (a) a single piece of metal forms said second mal-distribution member.

12. An apparatus for use in a filter system for filtering water or wastewater, said apparatus comprising:
(a) at least one underdrain lateral having a plurality of openings, said at least one underdrain lateral including at least one outer wall and at least one inner wall forming at least a first chamber and a second chamber, said first chamber being in fluid communication with said second chamber through at least one of said plurality of openings;
(b) a first sub-chamber for receiving and directing a washing fluid, said first sub-chamber being formed in said first chamber; and,
(c) a first mal-distribution member being disposed in said first chamber for preventing mal-distribution of a washing fluid, said first mal-distribution member and at least a portion of said at least one inner wall forming at least a portion of said first sub-chamber and at least a first portion of said first mal-distribution member being disposed below an uppermost portion of said second chamber.

13. An apparatus as set forth in claim 12, wherein:
(a) said at least one outer wall includes a first outer sidewall, a second outer sidewall and a bottom outer wall, said first outer sidewall and said second outer sidewall being inclined inwardly such that said first outer sidewall forms an acute angle with said bottom outer wall and said second outer sidewall forms an acute angle with said bottom outer wall.

14. An apparatus as set forth in claim 13, wherein:
(a) said at least one inner wall includes a first inner sidewall and a second inner sidewall, said first chamber is formed between said first inner sidewall and said first outer sidewall and a third chamber is formed between said second inner sidewall and said second outer sidewall, said first inner sidewall and said second inner sidewall being inclined inwardly such that said first inner sidewall forms an acute angle with said bottom outer wall and said second inner sidewall forms an acute angle with said bottom outer wall.

15. An apparatus as set forth in claim 14, wherein:
(a) said second chamber is disposed between said first chamber and said third chamber.

16. An apparatus as set forth in claim 14, further including:
(a) a second sub-chamber for receiving and directing a washing fluid, said second sub-chamber being formed in said third chamber; and,
(c) a second mal-distribution member being disposed in said third chamber for preventing mal-distribution of a washing fluid, said second mal-distribution member and at least a portion of said second inner sidewall forming at least a portion of said second sub-chamber and at least a portion of said second mal-distribution member being disposed below an uppermost portion of said second chamber.

17. An apparatus as set forth in claim 16, wherein:
(a) said second mal-distribution member includes a plurality of openings.

18. An apparatus as set forth in claim 12, wherein:
(a) a single piece of metal forms said first mal-distribution member.

19. An apparatus for use in a filter system for filtering water or wastewater, said apparatus comprising:
(a) at least one underdrain lateral having a plurality of openings, said at least one underdrain lateral including a first outer sidewall, a second outer sidewall, a bottom wall and at least one inner wall forming at least a first chamber and a second chamber, said first chamber being in fluid communication with said second chamber through at least one of said plurality of openings;
(b) a first sub-chamber for receiving and directing a washing fluid, said first sub-chamber being formed in said first chamber; and,
(c) a first mal-distribution member being disposed in said first chamber for preventing mal-distribution of a washing fluid, said first mal-distribution member and at least a portion of said at least one inner wall forming at least a portion of said first sub-chamber and at least a portion of said first chamber being disposed below an uppermost portion of said second chamber.

20. An apparatus as set forth in claim 19, wherein:
(a) said first outer sidewall and said bottom wall are formed from a single piece of material; and,
(b) at least a portion of said first mal-distribution member is disposed below an uppermost portion of said second chamber.

* * * * *